United States Patent
Wise et al.

(10) Patent No.: US 8,793,148 B2
(45) Date of Patent: Jul. 29, 2014

(54) FUEL DISTRIBUTION NETWORK

(76) Inventors: Robert Leroy Wise, Houston, TX (US); Kenneth Wayne Templeton, Katy, TX (US); Kenneth Ray Reeder, Pearland, TX (US)

( * ) Notice: Subject to any disclaimer, the term of this patent is extended or adjusted under 35 U.S.C. 154(b) by 835 days.

(21) Appl. No.: 12/885,119

(22) Filed: Sep. 17, 2010

(65) Prior Publication Data

US 2012/0067457 A1   Mar. 22, 2012

(51) Int. Cl.
*G06Q 50/00* (2012.01)
*G07F 11/00* (2006.01)
*B67D 7/14* (2010.01)
*G06Q 10/02* (2012.01)
*G07F 13/02* (2006.01)
*G06Q 10/10* (2012.01)
*G06Q 10/00* (2012.01)
*G06Q 30/00* (2012.01)

(52) U.S. Cl.
CPC .............. *G06Q 10/02* (2013.01); *G07F 11/002* (2013.01); *B67D 7/145* (2013.01); *G07F 13/025* (2013.01); *G06Q 10/10* (2013.01)
USPC ................. 705/5; 705/1.1; 705/7.35

(58) Field of Classification Search
USPC ......... 705/1.1, 5, 7.11–7.36, 13, 14.1, 15, 28, 705/300, 348
See application file for complete search history.

(56) References Cited

U.S. PATENT DOCUMENTS

| | | | |
|---|---|---|---|
| 2008/0249813 A1* | 10/2008 | Schmeyer | 705/5 |
| 2008/0316006 A1* | 12/2008 | Bauman et al. | 340/425.5 |
| 2010/0169008 A1* | 7/2010 | Niwa et al. | 701/208 |
| 2010/0211643 A1* | 8/2010 | Lowenthal et al. | 709/206 |
| 2011/0025267 A1* | 2/2011 | Kamen et al. | 320/109 |
| 2011/0074351 A1* | 3/2011 | Bianco et al. | 320/109 |

\* cited by examiner

*Primary Examiner* — George Chen
(74) *Attorney, Agent, or Firm* — Osha Liang LLP

(57) ABSTRACT

A method for using a fuel distribution network. The method including receiving a fuel reservation request (FRR) from a fuel network user interface module (FNUIM), obtaining a physical location of the FNUIM, determining a user associated with the FRR, and obtaining a list of fuel stations using the physical location and information associated with the user. The method further includes sending, to FNUIM, a list of fuel stations, receiving, from the FNUIM, a selection request specifying a fuel station from the list of fuel stations and a fuel reservation amount specifying an amount of fuel, sending a backend service provider (BSP) reservation request to the fuel station, where the BSP reservation request comprises the fuel reservation amount, and sending a confirmation message comprising a reservation expiration time to the FNUIM.

21 Claims, 19 Drawing Sheets

FUEL DISTRIBUTION NETWORK

BACKGROUND

In an attempt to lower carbon emissions and make more fuel efficient vehicles, car manufactures have developed hybrid vehicles, electric vehicles, and vehicles that run on other types of alternative fuels, such as hydrogen or compressed natural gas (CNG).

Unfortunately, the widespread adoption of such vehicles has been hampered by the lack of fueling infrastructure. Specifically, there is a lack of fueling stations that can service hybrid vehicles, electric vehicles, and vehicles that run on other types of alternative fuels.

As a result owners of hybrid vehicles, electric vehicles, and vehicles that run on other types of alternative fuels are required to purchase their own fuel station to fuel their vehicle. In addition, because the owner only has access to their own fuel station, the furthest distance the owner may travel from the fuel station in their vehicle is limited to the fuel storage capacity of the vehicle.

SUMMARY

In general, in one aspect, the invention relates to a computer readable medium comprising computer readable program code embodied therein for causing a computer system to perform a method, the method comprising receiving a fuel reservation request (FRR) from a fuel network user interface module (FNUIM), obtaining a physical location of the FNUIM, determining a user associated with the FRR, obtaining a list of fuel stations using the physical location and information associated with the user, sending, to FNUIM, a list of fuel stations, receiving, from the FNUIM, a selection request specifying a fuel station from the list of fuel stations and a fuel reservation amount specifying an amount of fuel, sending a backend service provider (BSP) reservation request to the fuel station, wherein the BSP reservation request comprises the fuel reservation amount, and sending a confirmation message comprising a reservation expiration time to the FNUIM.

In general, in one aspect, the invention relates to a fuel network user interface module (FNUIM), comprising a processor, a user interface, a memory, and software instructions stored in memory, which when executed by the processor, perform a method, the method comprising: generating a fuel reservation request (FRR), wherein the FRR specifies a vehicle, sending the FRR to a backend service provider (BSP), receiving a list of fuel stations from the BSP, displaying the list of fuel stations on the user interface, generating a selection request specifying a fuel station from the list of fuel stations and a fuel reservation amount specifying an amount of fuel, sending the selection request to the BSP, and receiving, from the BSP, a confirmation message comprising a reservation expiration time.

In general, in one aspect, the invention relates to a fuel station comprising a fuel storage unit configured to store fuel, a fuel output connection operatively connected to the fuel storage unit and configured to interface with a vehicle to enable transfer of the fuel from the fuel storage unit to the vehicle, a fuel station control module comprising, a processor, a memory, and software instructions stored in memory, which when executed by the processor, perform a method, the method comprising receiving a backend service provider (BSP) reservation request, wherein the BSP reservation request comprises a user ID, a fuel reservation amount specifying an amount of fuel and a reservation expiration time, wherein the amount of fuel is reserved for a user associated with the user ID at the fuel station until expiration of the reservation expiration time, storing, in response to the BSP reservation request, a fuel reservation record comprising the user ID, the fuel reservation amount, and the reservation expiration time, prior to expiration of the reservation expiration time: receiving a request to access the fuel station from the user associated with the user ID, authenticating the user, obtaining, after successful authentication, the fuel reservation record using the user ID, granting access to the fuel output connection, and enabling the user to transfer up to the amount of fuel specified in the fuel reservation amount to the vehicle using the fuel output connection.

Other aspects of the invention will be apparent from the following description and the appended claims.

DETAILED DESCRIPTION

Figure 1:
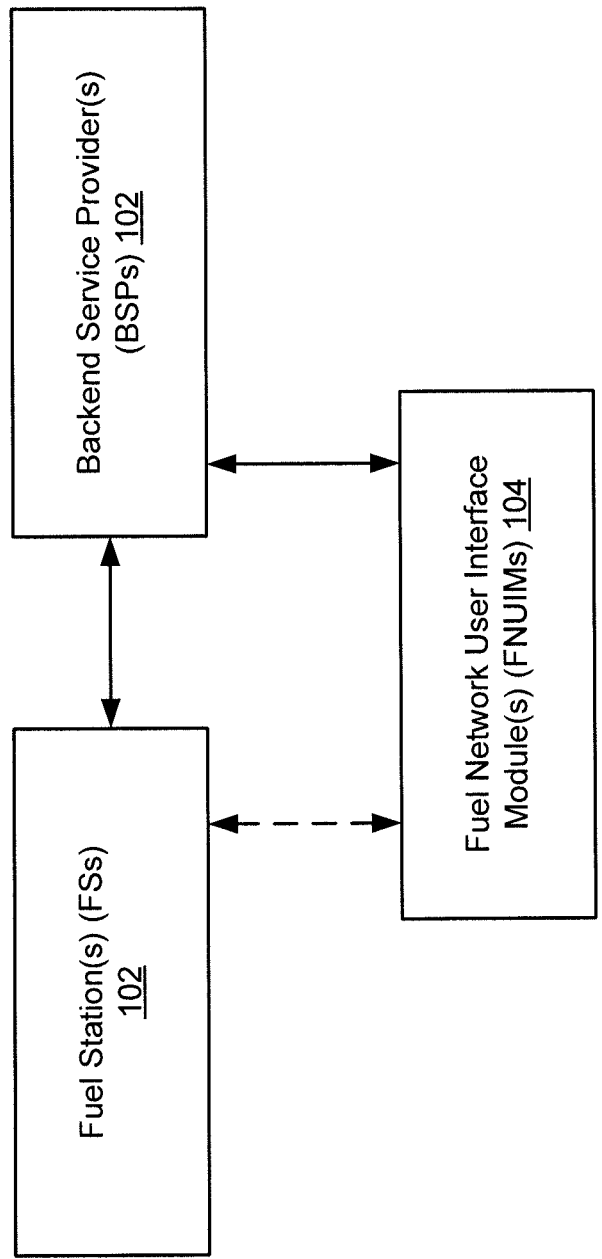
FIGS. 1-4 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a fuel distribution network. More specifically, embodiments of the invention relate to a fuel distribution network that allows a user to remotely locate fuel stations, reserve fuel in advance, and then obtain the reserved fuel at the specified fuel station. Further, embodiments of the invention relate to a fuel distribution network facilitated by a virtual private infrastructure and promoted through social media, including but not limited to social networking, web presence, and texting.

FIG. 1 shows a fuel distribution network in accordance with embodiments of the invention. The system includes one or more backend service providers (BSPs) (100), one or more fuel stations (FSs) (102), and one or more Fuel Network User Interface Module(s) (FNUIMs) (104).

In one or more embodiments of the invention, the BSPs (100) are configured to manage the fuel distribution network including managing the FSs and the FNUIMs (104). The BSPs (100) are described in more detail in FIGS. 4 7B, 8, 9A, 9B, and 11.

In one or more embodiments of the invention, the FSs (102) are configured to generate, store, and dispense fuel. The FSs (102) are described in more detail in FIGS. 3A, 3B, 5, 7A, 7B, 11, and 12.

In one or more embodiments of the invention, the FNUIMs (104) are configured to allow a user to locate a FS, reserve fuel, pay for fuel, receive evidence of payment, and access the FS. The FNUIMs (104) are described in more detail in FIGS. 2A-2C, 6, 10, and 12.

Figure 2A:
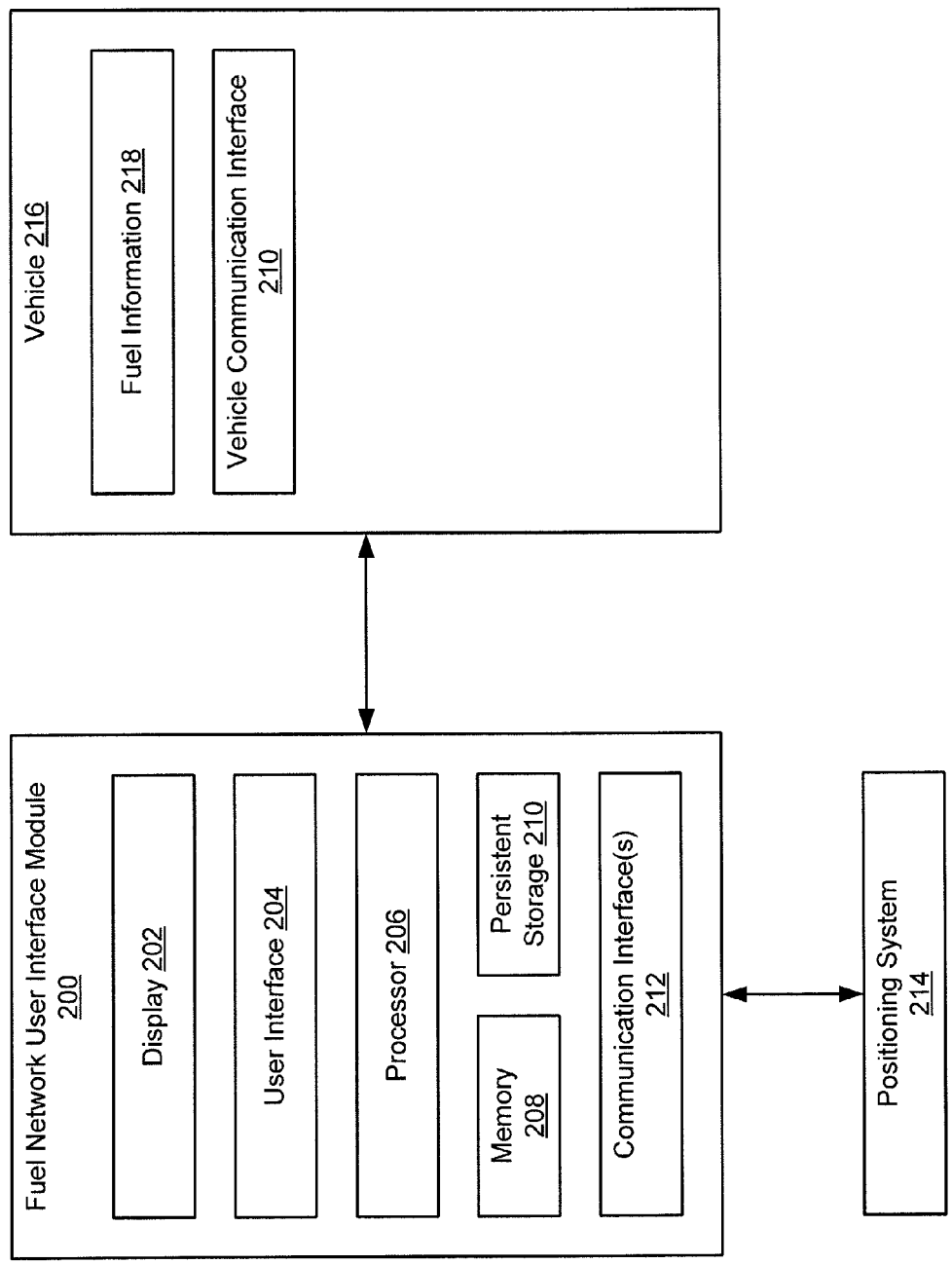
Figure 2B:
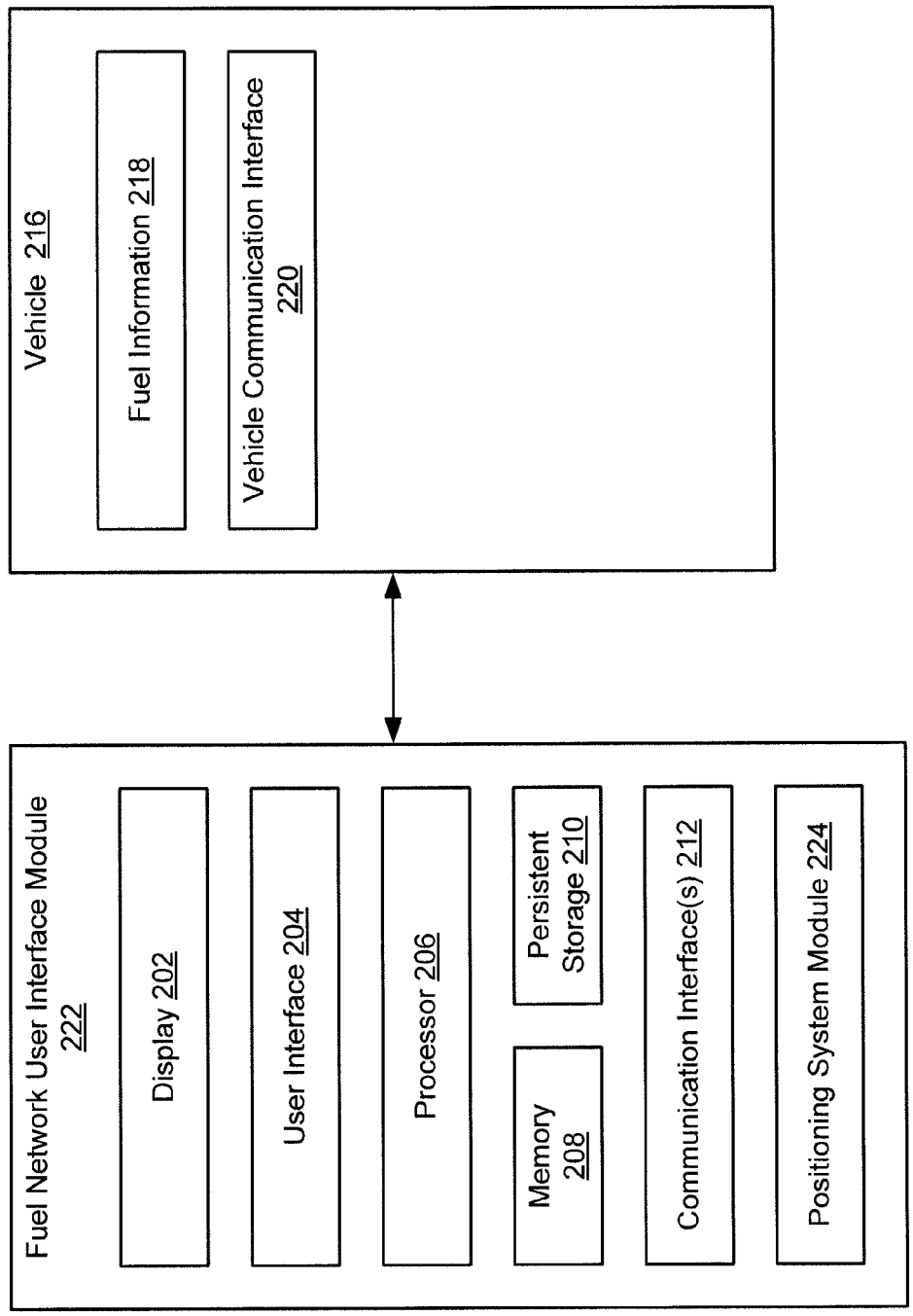
Figure 2C:
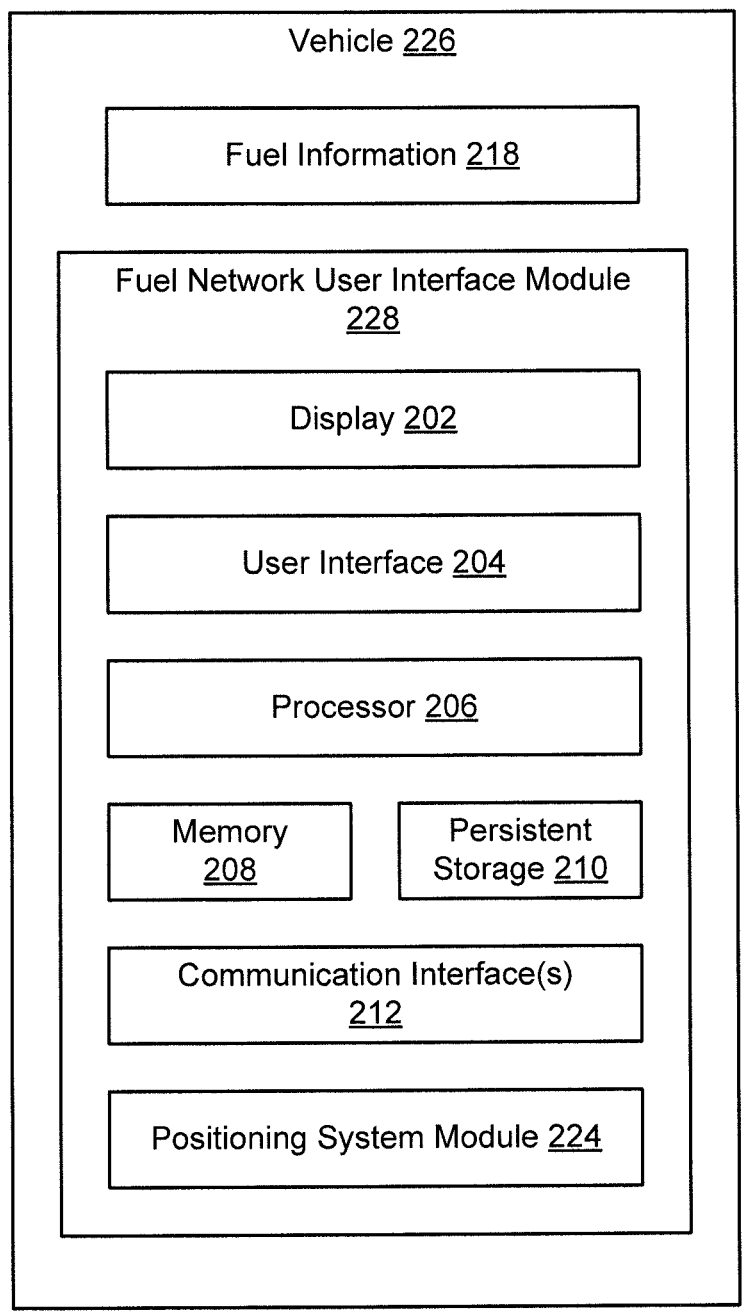

FIGS. 2A-2C show FNUIMs in accordance with one or more embodiments of the invention. Referring to FIG. 2A, the FNUIM (200) includes a display (202), a user interface (204), a processor (206), memory (208), persistent storage (210), and one or more communication interfaces (212). Each of these components is described below.

In one embodiment of the invention, the display (202) corresponds to any interface configured to output images to a user. In one or more embodiments of the invention, the display (202) may be implemented using liquid-crystal display (LCD) technology, organic light-emitting diode (OLED) technology, LED technology, or any other technology capable of outputting images to a user.

In one embodiment of the invention, the user interface (204) corresponds to any interface through which a user may provide input to the FNUIM (200). Examples of user interfaces include, but are not limited to a keypad, a keyboard, a capacitive touch screen, a track ball, one or more physical buttons, and a virtual keyboard. Those skilled in the art will appreciate that in certain embodiments of the invention, the display and the user interface may be implemented as a single unit, for example, as a capacitive touch screen.

In one or more embodiments of the invention, the processor (206) is any microprocessor or integrated circuit configured to execute software instructions stored in the memory (208) and/or persistent storage (210). Further, the FNUIM (200) may include multiple processors.

In one or more embodiments of the invention, the memory (208) is any volatile non-transitory computer readable storage medium configured to store data and software instructions, which, when executed by the processor, enable the FNUIM to perform various functions as described above and below. Examples of memory (208) include, but are not limited to random access memory (RAM) and cache memory.

In one or more embodiments of the invention, the persistent storage (210) is any non-volatile non-transitory computer readable storage medium configured to store data and software instructions, which, when executed by the processor, enable the FNUIM to perform various functions as described above and below. Examples of persistent storage (210) include, but are not limited to, magnetic storage, NOR-type flash memory, and NAND-type flash memory. Though not shown in FIG. 2A, the FNUIM may use persistent storage located in a location remote to the FNUIM, e.g., cloud storage, etc. Further, the FNUIM may use persistent storage located in a smartcard operatively connected to the FNUIM.

In one or more embodiments of the invention, the communication interface(s) (212) correspond to any user interface that enables the FNUIM (200) to communicate with one or more external systems. Examples of the external systems include, but are not limited to, a vehicle (216), a positioning system (214), a FS (102 in FIG. 1) and a BSP (100 in FIG. 1). Examples of communication interfaces include, but are not limited to, an antenna, a serial port, a parallel port, a universal serial bus (USB) interface, any type of wired or wireless network interface connection, and a Bluetooth® interface (Bluetooth is a registered trademark of Bluetooth SIG, Inc.). Further, in one or more embodiments of the invention, the communication interface(s) (212) may also support Global System for Mobile (GSM) communications, 3G and/or 4G standards for mobile phone communication, and any other future telecommunication standards.

In one or more embodiments of the invention, the positioning system (214) includes functionality to obtain the physical location of the FNUIM (200). The positioning system (214) may be configured to use one or more mechanisms to obtain the physical location of the FNUIM (200). For example, the positioning system (214) may use cellular tower triangulation (i.e., analysis of signals received at three or more cellular towers from a cellular device), cellular tower proximity (i.e., analysis of the strength of a signal received at a single cellular tower), Global Positioning System (GPS) technology, network access point proximity (e.g., analysis of a signal received at a wireless network access point), inertial navigation, other mechanisms for determining the physical location of the FNIUM (200), or any combination thereof.

In one embodiment of the invention, the vehicle (216) corresponds to any vehicle, including but not limited to, hybrid vehicles, electric vehicles, or vehicles that run on other types of alternative fuels, such as hydrogen or compressed natural gas (CNG).

In one embodiment of the invention, the fuel information (218) may include, but is not limited to, one or more of the following: (i) information about the type of fuel(s) the vehicle may use, (ii) the amount of each type of fuel the vehicle may store, (iii) the amount of each type of fuel currently stored in the vehicle, and (iv) the rate at which each type of fuel is used by the vehicle.

In one embodiment of the invention, the fuel information (218) may be communicated from the vehicle (216) to the FNUIM (200) using a vehicle communication interface (220). The vehicle communication interface (220) includes any wired or wireless interface that enables the vehicle (216) to communicate with one or more external systems, such as the FNUIM (200).

In one embodiment of the invention, the FNUIM (200) shown in 2A may be a smart phone or another device with the components shown in FIG. 2A. In one embodiment of the invention, the FNUIM (200) may not interface with the vehicle communication interface (220); rather, the FNUIM (200) may function without information from the vehicle. Accordingly, the FNUIM (200) may be implemented using mobile devices (e.g., phones, tablet computing devices, laptops) and web-connected interfaces (desktop, laptops, web-enabled televisions, and other such systems).

Referring to FIG. 2B, the FNUIM (222) includes the same components as the FNUIM (200) in FIG. 2A. Further, the FNUIM (222) includes a positioning system module (224), which includes the same functionality as the positioning system (214) described in FIG. 2A. In one embodiment of the invention, the FNUIM (222) shown in 2B may be a smart phone or another device with the components shown in FIG. 2B. In one embodiment of the invention, the FNUIM (200) may not interface with the vehicle communication interface (220); rather, the FNUIM (200) may function without information from the vehicle. Accordingly, the FNUIM (200) may be implemented using mobile devices (e.g., phones, tablet computing devices, laptops) and web-connected interfaces (desktop, laptops, web-enabled televisions, and other such systems).

Referring to FIG. 2C, the FNUIM (228) is integrated into the vehicle (226). The FNUIM (228) includes the same components as the FNUIM (222) in FIG. 2B. Those skilled in the art will appreciate that the positioning system module (224) shown in FIG. 2C may be integrated directly with the vehicle (226) and interface with the FNUIM (228) instead of being integrated into the FNUIM (228) as shown in FIG. 2C.

The FNUIM is not limited to the embodiments shown in FIGS. 2A-2C above.

Figure 3A:
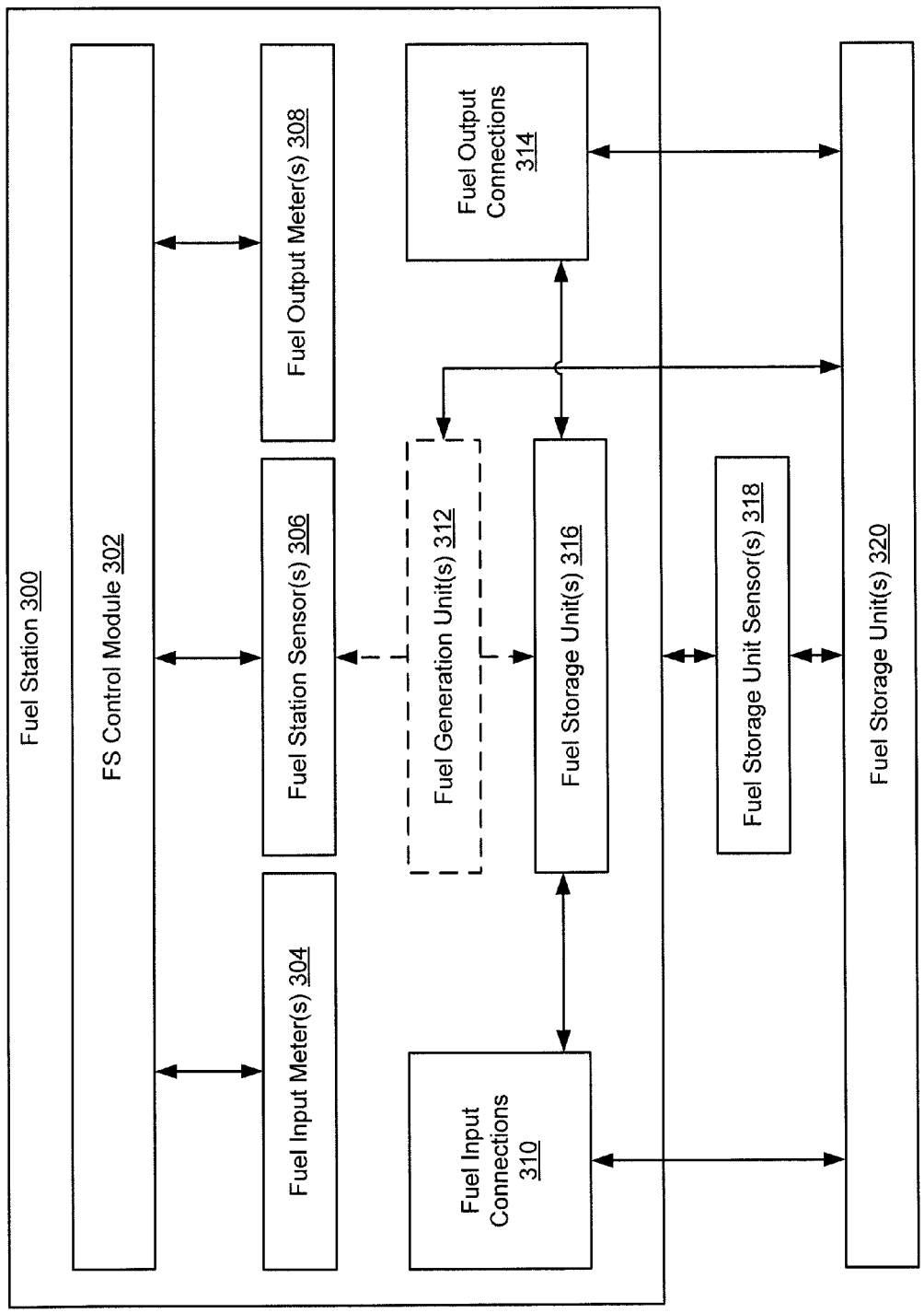

FIG. 3A shows a fuel station (FS) (300) in accordance with one or more embodiments of the invention. The FS (300)

includes a FS control module (302), one or more fuel input meters (304), one or more fuel station sensors (306), one or more fuel output meters (308), one or more fuel input connections (310), one or more fuel storage units (316, 320), one or more fuel output connections (314), one or more fuel storage unit sensors (318), and optionally, one or more fuel generation units (312). Each of these components is described below.

In one embodiment of the invention, the FS (300) is encased in a protective box or shell such that unauthorized users may not access the fuel stored in the FS (300) or access components of the FS (300) necessary to access the fuel stored in the FS (300). The protective box or shell may be made out of any suitable material such as metal, metal alloys, plastic, a composite material, or any combination thereof. Further, though not shown, access to the various FS components may be achieved by successfully unlocking the protective box or shell. In one embodiment of the invention, the protective box or shell may be unlocked by successfully authenticating the user of the FNUIM (104 in FIG. 1) to the BSP (100 in FIG. 1).

Figure 3B:
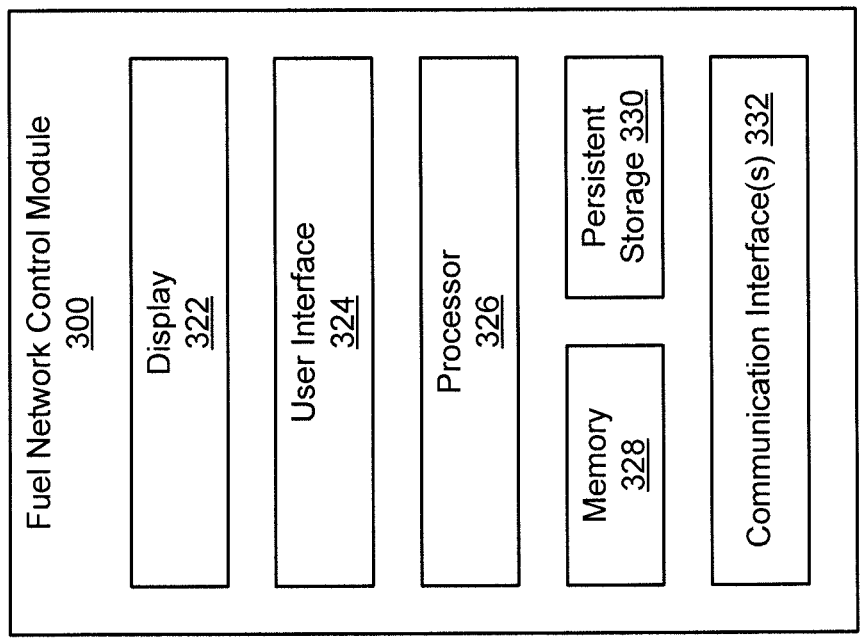

In one or more embodiments of the invention, the FS control module (302) is configured to control the FS (300) (see FIG. 3B). More specifically, the FS control module includes functionality to (i) monitor the FS (300) using the various meters (304, 308) and various sensors (306) in the FS (300); (ii) communicate the information obtained in (i) to the BSP (100 in FIG. 1); (iii) enable a user to reserve fuel; and (iv) unlock the protective box or shell surrounding the FS (300) in order to enable a user to access the fuel stored in the FS (300) or to perform maintenance on the FS.

In one or more embodiments of the invention, the fuel input meters (304) correspond to meters configured to track the amount of fuel input into the FS (300). Each type of fuel may be tracked using a separate fuel input meter. Examples of input meters include, but not limited to, an input meter to track the amount of CNG input into the FS, and an input meter to track the amount of electricity input into the FS. In one or more embodiments of the invention, the fuel input meters may also include functionality to determine the initial amount of fuel in the FS, e.g., at the time the FS is initially configured and/or deployed.

In one or more embodiments of the invention, the fuel station sensors (306) are configured to monitor the environmental conditions of the FS (300) (or components located therein). Examples of the fuel station sensors include, but are not limited to, temperature sensors, moisture sensors, pressure sensors, and door-open sensors used to monitor when the protective box or shell is unlocked. Further, the fuel station sensors (306) may include video and audio surveillance equipment used to monitor the FS.

In one or more embodiments of the invention, the fuel output meters (308) are configured to track the amount of fuel output from the FS (300). Each type of fuel may be tracked using a separate fuel output meter. Examples of output meters include, but are not limited to, an output meter to track the amount of CNG output from the FS, an output meter to track the amount of hydrogen gas output from the FS, and an output meter to track the amount of electricity output from the FS.

In one or more embodiments of the invention, the fuel input connections (310) correspond to the physical interfaces required to transfer fuel from an external source into the FS. Those skilled in the art will appreciate that the particular type of fuel input connection varies depending on the type of fuel being input. Examples of fuel input connections include, but are not limited to, electrical connections and a hose.

In one or more embodiments of the invention, the fuel storage units (316, 320) correspond to containers and/or devices used to store fuel, where such containers and/or devices may be modular and/or extendable. Those skilled in the art will appreciate that the particular type of fuel storage unit varies depending on the type of fuel being stored. Examples of fuel storage units include, but are not limited to, CNG canisters, hydrogen gas canisters, and batteries. In one or more embodiments of the invention, one or more fuel storage units may be located externally from the FS. For example, a fuel storage unit may be located under ground, below the location of the FS.

In one or more embodiments of the invention, the fuel output connections (314) correspond to the physical interfaces required to transfer fuel from the FS to an external source, e.g., a vehicle. Those skilled in the art will appreciate that the particular type of fuel output connection varies depending on the type of fuel being output. Examples of fuel output connections include, but are not limited to, electrical connections and a hose.

In one or more embodiments of the invention, the fuel storage unit sensors (318) monitor the environmental conditions of the fuel storage units located externally from the FS. Examples of fuel storage unit sensors include, but are not limited to, temperature sensors, moisture sensors, pressure sensors, and fuel storage unit open sensors configured to monitor when a particular fuel storage unit (320) is being accessed.

In one or more embodiments of the invention, the fuel generation units (312) are configured to generate fuel to be stored in the fuel storage units (316, 320). Examples of fuel generation units include, but are not limited to, electrolysis device to separate Hydrogen from water, a gas reformer to generate hydrogen, and a generator configured to use hydrogen to generate electricity.

FIG. 3B shows a FS control module (300) in accordance with one or more embodiments of the invention. The FS control module (300) includes a display (322), a user interface (324), a processor (326), memory (328), persistent storage (330), and one or more communication interfaces (332). Each of these components is described below.

In one embodiment of the invention, the display (322) corresponds to any interface configured to output images to a user. In one or more embodiments of the invention, the display (322) may be implemented using LCD technology, OLED technology, LED technology, or any other technology capable of outputting images to a user. In one embodiment of the invention, the user may be able to view the display (322) prior to successful authentication of the user.

In one embodiment of the invention, the user interface (324) corresponds to any interface through which a user may provide input to the FS control module (300). Examples of user interfaces include, but are not limited to a keypad, a keyboard, a capacitive touch screen, a track ball, one or more physical buttons, and a virtual keyboard. Those skilled in the art will appreciate that in certain embodiments of the invention, the display and the user interface may be implemented as a single unit, for example, as a capacitive touch screen. In one embodiment of the invention, the user may be able to use the user interface (324) prior to input information necessary to authenticate the user.

In one or more embodiments of the invention, the processor (326) is any microprocessor or integrated circuit configured to execute software instructions stored in the memory (328) and/or persistent storage (330). Further, the FS control module (300) may include multiple processors.

In one or more embodiments of the invention, the memory (328) is any volatile non-transitory computer readable storage medium configured to store data and software instructions, which, when executed by the processor, enable the FS control module to perform various functions as described above and below. Examples of memory (328) include, but are not limited to RAM and cache memory.

In one or more embodiments of the invention, the persistent storage (330) is any non-volatile non-transitory computer readable storage medium configured to store data and software instructions, which, when executed by the processor, enable the FS control module to perform various functions as described above and below. Examples of persistent storage (330) include, but are not limited to, magnetic storage, NOR-type flash memory, and NAND-type flash memory. Though not shown in FIG. 3B, the FS control module may use persistent storage located in a location remote to the FS, e.g., cloud storage, etc.

In one or more embodiments of the invention, the communication interface(s) (332) correspond to any user interface that enables the FS control module to communicate with sensors and meters in the FS (300) as well as external systems. Examples of the external systems include, but are not limited to, a FNUIM (104 in FIG. 1) and a BSP (100 in FIG. 1). Examples of communication interfaces include, but are not limited to, an antenna, a serial port, a parallel port, USB interface, any type of wired or wireless network interface connection, and a Bluetooth® interface. Further, in one or more embodiments of the invention, the communication interface(s) (332) may also support GSM communications, 3G and/or 4G standards for mobile phone communication, and any other future telecommunication standards.

Figure 4:
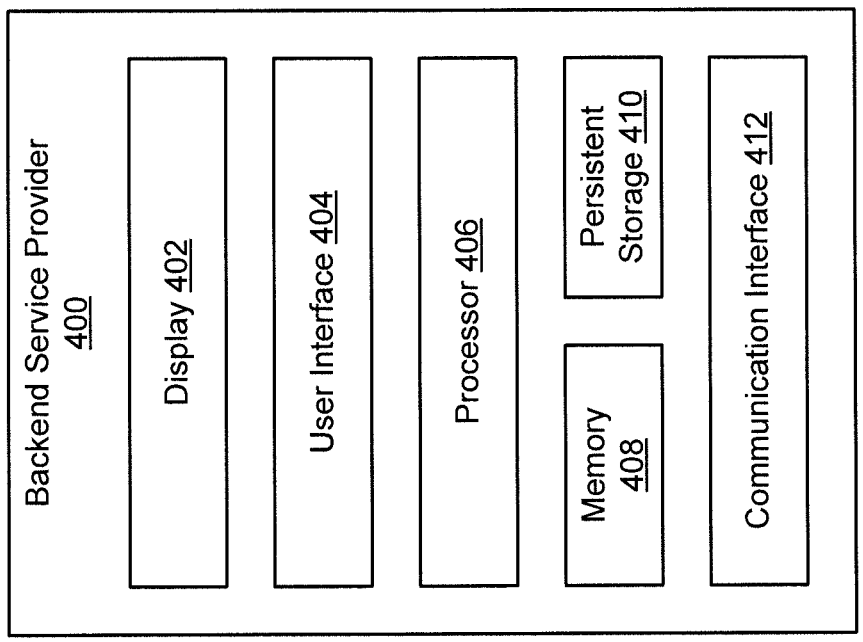

FIG. 4 shows a backend service provider (BSP) in accordance with one or more embodiments of the invention. The BSP (400) is configured to interface with the FNUIMs (104 in FIG. 1) and the FSs (102 in FIG. 1).

The BSP (400) includes a display (402), a user interface (404), a processor (406), memory (408), persistent storage (410), and one or more communication interfaces (412). Each of these components is described below.

In one embodiment of the invention, the display (402) corresponds to any interface configured to output images to a user of the BSP. In one or more embodiments of the invention, the display (402) may be implemented using LCD technology, OLED technology, LED technology, or any other technology capable of outputting images to a user. In one embodiment of the invention, the user may be able to view the display (402) prior to successful authentication of the user.

In one embodiment of the invention, the user interface (404) corresponds to any interface through which a user may provide input to the BSP (400). Examples of user interfaces include, but are not limited to a keypad, a keyboard, a capacitive touch screen, a track ball, one or more physical buttons, and a virtual keyboard. Those skilled in the art will appreciate that in certain embodiments of the invention, the display and the user interface may be implemented as a single unit, for example, as a capacitive touch screen.

In one or more embodiments of the invention, the processor (406) is any microprocessor or integrated circuit configured to execute software instructions stored in the memory (408) and/or persistent storage (410). Further, the BSP (400) may include multiple processors.

In one or more embodiments of the invention, the memory (408) is any volatile non-transitory computer readable storage medium configured to store data and software instructions, which when executed by the processor enable the BSP to perform various functions as described above and below. Examples of memory (408) include, but are not limited to RAM and cache memory.

In one or more embodiments of the invention, the persistent storage (410) is any non-volatile non-transitory computer readable storage medium configured to store data and software instructions, which when executed by the processor enable the BSP to perform various functions as described above and below. Examples of persistent storage (410) include, but are not limited to, magnetic storage, NOR-type flash memory, and NAND-type flash memory. Though not shown in FIG. 4, the BSP may use persistent storage located in a location remote to the BSP, e.g., cloud storage, etc.

In one or more embodiments of the invention, the communication interface(s) (412) correspond to any user interface that enables the BSP to communicate with external systems. Examples of the external systems include, but are not limited to, a FNUIM (104 in FIG. 1) and a FS (102 in FIG. 1). Examples of communication interfaces include, but are not limited to, an antenna, a serial port, a parallel port, a USB interface, any type of wired or wireless network interface connection, and a Bluetooth® interface. Further, in one or more embodiments of the invention, the communication interface(s) (332) may also support GSM communications, 3G and/or 4G standards for mobile phone communication, and any other future telecommunication standards.

In one or more embodiments of the invention, the BSP includes functionality to remotely control the FSs and/or FNUIMs. The instructions issued from the BSP to remotely control the FSs and/or FNUIMs may be communicated over the aforementioned communication interfaces.

Figure 5:
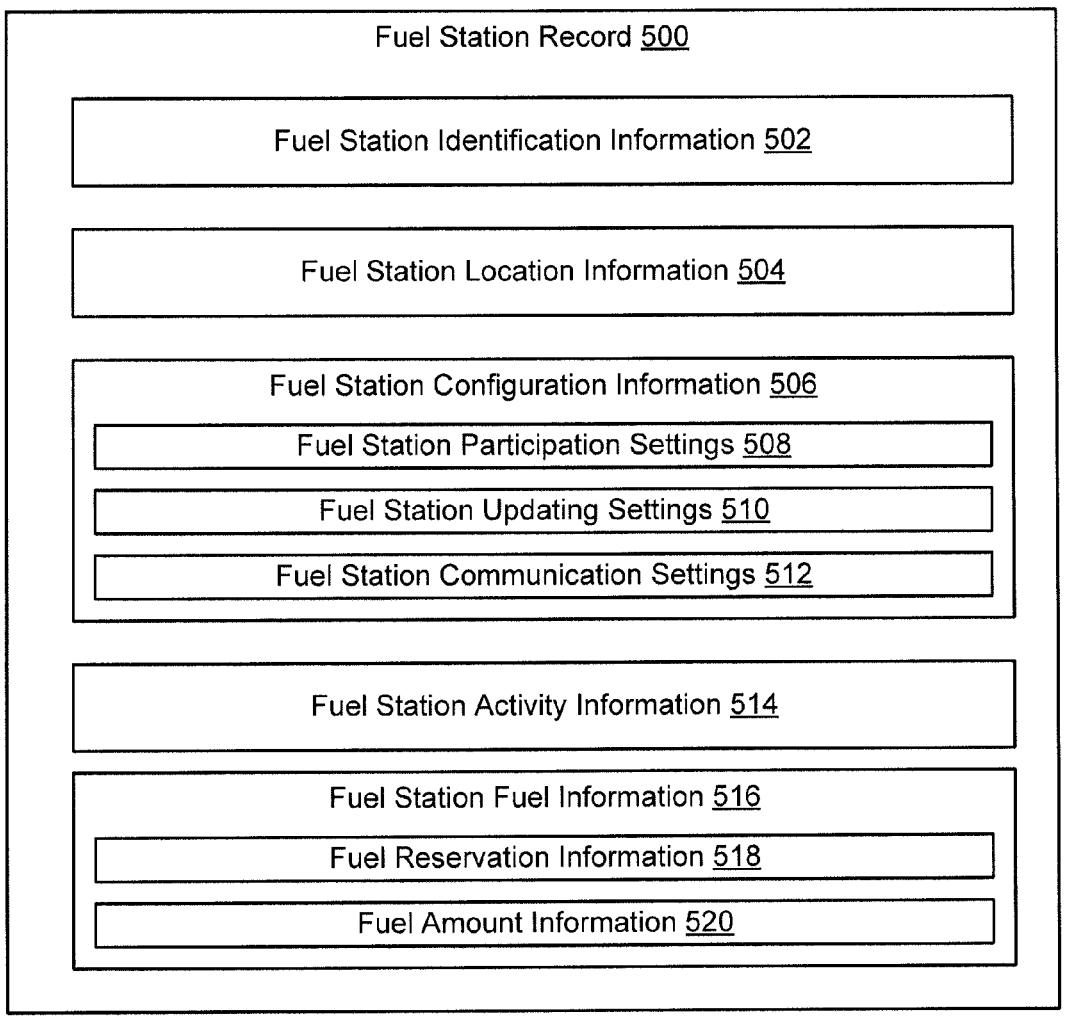
FIGS. 5-6 show data structures in accordance with one or more embodiments of the invention.

FIG. 5 shows a fuel station record (FSR) (500) in accordance with one or more embodiments of the invention. The FSR (500) may be stored in one or more BSPs (100 in FIG. 1). Further, the FSR (500) may be stored in one or more FSs (102 in FIG. 1) in such cases the FSR stored on the FNUIM is referred to as a local FSR. The FSR (500) includes information about a particular FS.

In one or more embodiments of the invention, the FSR (500) includes FS identification information (502), FS location information (504), FS configuration information (506), FS activity information (514), and FS fuel information (516). Each of these components is discussed below. Those skilled in the art will appreciate that the FSR (500) may include other information not shown in FIG. 5.

In one embodiment of the invention, the FS identification information (502) includes information used to uniquely identify the FS (502) with which the FSR (500) is associated. For example, the FS identification information may include, but is not limited to, the serial number of the FS assigned by the manufacturer of the FS, the name of the manufacturer, and a unique identifier assigned to the FS by the BSP.

In one embodiment of the invention, the FS location information (504) includes information about the physical location of the FS such as the address of the physical location of the FS and/or the GPS coordinates of the FS.

In one embodiment of the invention, the FS configuration information (506) includes information related to the various configuration settings for the FS. In one embodiment of the invention, the FS configuration information includes the FS participation settings (508), FS updating settings (510), and FS communication settings (512).

In one embodiment of the invention, the FS participation settings (508) define which users, group(s) of users, or a combination thereof, who may access the FS. For example, the FS may be part of a co-ownership of FSs, e.g., all home owners in a gated community, where only members of the co-ownership may obtain fuel from the FS. In another example, the FS may be a public FS, such that any user may obtain fuel from the FS. In yet another example, the FS may be a private FS, such that only the owner of the FS and users approved by the owner may obtain fuel from the FS. In one embodiment of the FS participation settings (508) may change over time.

In one embodiment of the invention, the FS update settings (510) specify how status information about the FS (e.g., FS activity notifications generated using the FS activity information (514), and FS Fuel Information (516)) is transmitted to the BSP. In one embodiment of the invention, status information is only sent when new activity is recorded in the FS activity information. In another embodiment of the invention, the frequency at which status information is sent to the BSP is directly proportional to the average activity of the FS. The activity of the FS corresponds to fuel reservation, accessing the FS, fueling, and other events that generate entries in the FS activity information (discussed below). In this embodiment, the frequency may change over time based on changes in the average activity of the FS. Further, in the later embodiment status information may be sent to the BSP even when there are no new entries in the FS activity information.

In one embodiment of the invention, the FS communication settings (512) include information necessary to enable communication between the FS and the BSP (100 in FIG. 1) and, optionally, FNUIMs. Examples of communication settings include IP address configuration, configuration necessary from the FS to communicate over a GSM, 3G and/or 4G network, and/or any other type of configuration settings required to enable communication between the FS and the BSP.

In one embodiment of the invention, the FS activity information (514) includes entries corresponding to activity that occurred at/in the FS. Examples of activity include, but are not limited to, fueling, reservation of fuel, generation of fuel, reading of meters, reading of sensors, notification of unauthorized access to the FS, notification of damage to the FS, and notification of attempted unauthorized access to the FS.

In one embodiment of the invention, the FS fuel information (516) includes information about each type of fuel in the FS. More specifically, in one embodiment of the invention, the FS fuel information (516) includes fuel reservation information (518), and fuel amount information (520).

In one embodiment of the invention, the fuel reservation information (518) specifies the amount of each type of fuel in the FS that is reserved. More specifically, in one or more embodiments of the invention, the fuel reservation information (518) may include information about which user reserved which type and what amount of fuel.

In one embodiment of the invention, the fuel amount information (520) includes information about the total amount of each type of fuel that may be stored in the FS, the rate at which a given type of fuel is being generated in the FS, and the amount of each type of fuel currently available in the FS. In one embodiment of the invention, the amount of fuel currently available in the FS is determined using the total amount of the type of fuel currently stored in the FS less the amount of the type of fuel currently reserved.

Figure 6:
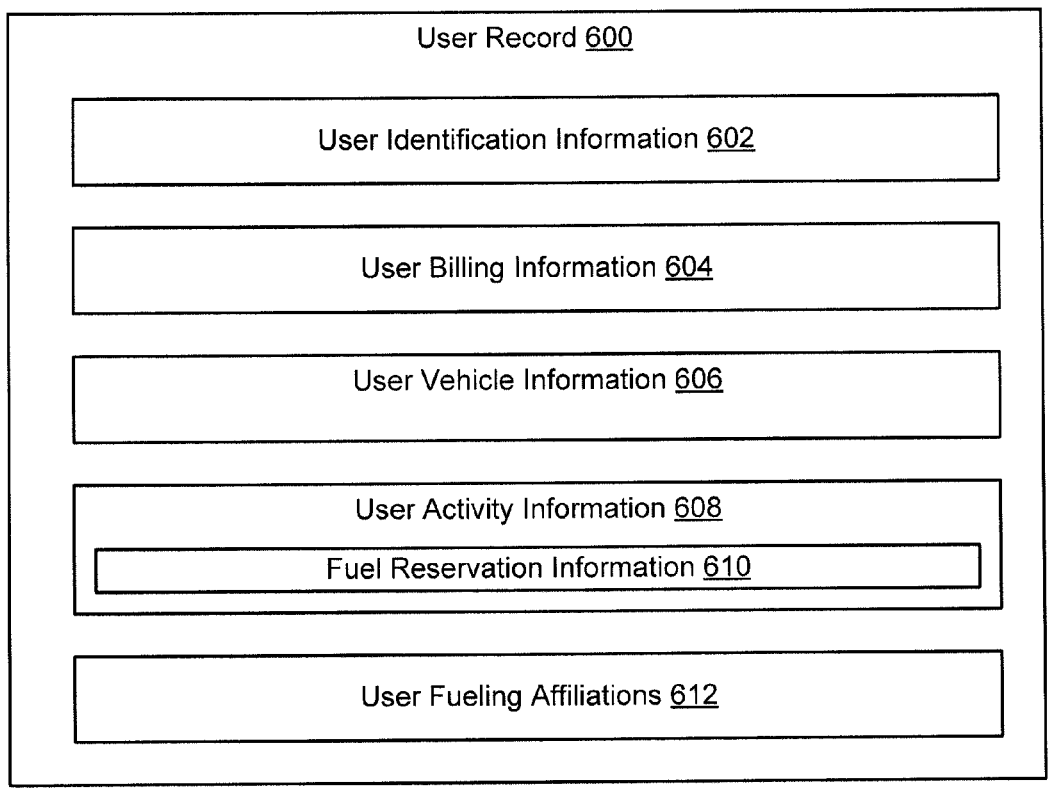

FIG. 6 shows a user record (UR) (600) in accordance with one or more embodiments of the invention. The UR (600) may be stored in one or more BSPs (100 in FIG. 1). Further, the UR (500) may be stored in one or more FNUIMs (104 in FIG. 1). Regardless of where the UR is stored, the UR is accessible (directly or indirectly) to the FNUIMs, the FSs, and the BSPs in the fuel distribution network.

In one or more embodiments of the invention, the UR (600) includes user identification information (602), user billing information (604), user vehicle information (606), user activity information (608), and user affiliations (612). Each of these components is described below.

In one or more embodiments of the invention, the user identification information (602) identifies the user. Examples of user identification information include, but are not limited to, a first name of the user, a last name of the user, a social security number of the user, a user ID number issued on another form of government ID, biometric information of the user, and/or a user ID assigned to the user by the BSP (or generated by the user).

In one or more embodiments of the invention, the user billing information (604) includes information about how to bill the particular user for the fuel obtained by the user. The user billing information (604) may include, for example, a billing address, a preferred form of payment for the user, credit card information of the user, bank account information of the user, and/or any other information necessary to bill the user.

In one or more embodiments of the invention, the user vehicle information (606) includes information about each vehicle associated with the user. For each vehicle, the user vehicle information may include, but is not limited to, the vehicle identification number (VIN), the make of the vehicle, the model of the vehicle, year of the vehicle, fuel type(s) used by the vehicle, and fuel storage capacity of the vehicle (on a per-fuel type basis).

In one or more embodiments of the invention, the user activity information (608) includes entries related to user activity as related to the fuel distribution network including, but not limited to, fuel reservations, fueling, cancelled fuel reservations, attempted access to FSs, and bill receipt and payment.

In one or more embodiments of the invention, the user affiliations (612) specify to which groups, if any, the user belongs, and/or which fuel station(s) the user is authorized to access. For example, if the user is associated with a particular co-ownership, then the user affiliations (612) may include the name (or other identifying information) of the co-ownership. Further, if a particular owner of a FS (or group of FSs) has authorized the user to access his FS (or group of FSs), then the user affiliations (612) may also include the fuel station identification information of the particular FS (or group of FSs) that the owner has allowed the user to access.

FIGS. 7-12 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, one or more of the methods described in the flowcharts may be performed in parallel.

Figure 7A:
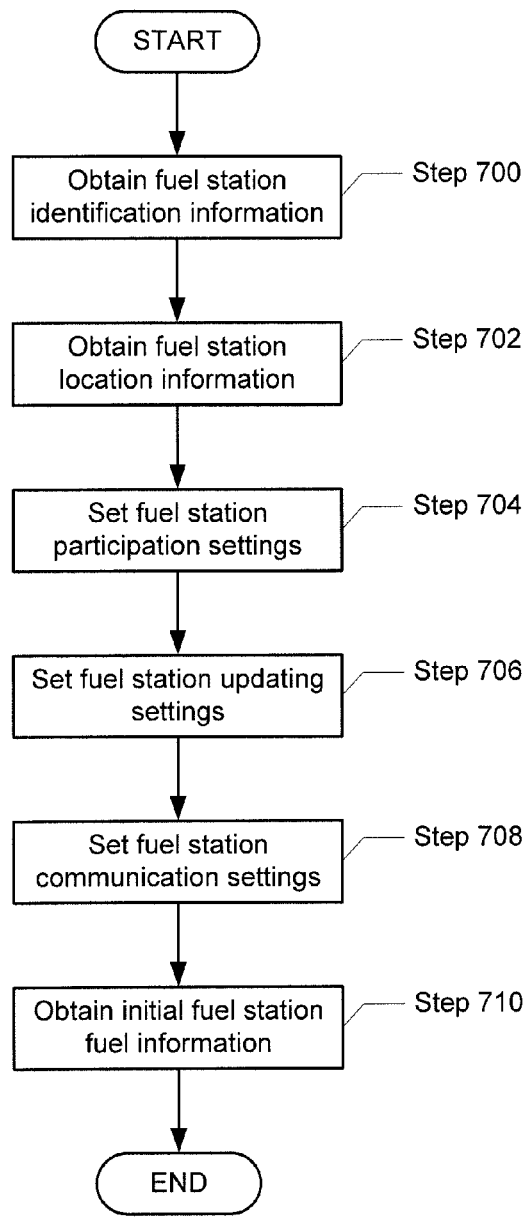
FIGS. 7-12 show flowcharts in accordance with one or more embodiments of the invention.

FIG. 7A shows a flowchart for setting up a fuel station in accordance with one or more embodiments of the invention. More specifically, FIG. 7A shows a method for populating a fuel station record (FSR). Once populated, the FS is part of the fuel distribution network and accessible to users in accordance with one or more embodiments of the invention. The flowchart shown in FIG. 7A may be performed by the FS and the corresponding FSR may be communicated to the BSP. In another embodiment of the invention, the BSP may populate the FSR during a FS configuration process, which occurs after the FS is deployed and connected, e.g., over a network (wired or wireless), to the BSP. In addition, the FSR generated/ populated in FIG. 7A may be stored at the BSP and the corresponding FS. In such cases, the FSR stored at the FS is designated as the local FSR.

Turning to FIG. 7A, in Step 700, the FS identification information is obtained. The FS identification information may be obtained from the owner of the FS. In Step 702, the FS location information is obtained. The FS location may be obtained from the owner of the FS, obtained another individual with FS location information, using a GPS (or other positioning technology), using any other method or technology for determining the physical location of the FS, or any combination thereof.

In Step 704, the FS participating settings are set. In one embodiment of the invention, setting the FS participating settings may include using information provided by the owner of the FS (or another individual) about which users or group(s) of users may access the fuel station. In Step 706, the FS update settings are set. In one embodiment of the invention, the FS update settings based on a default setting, a preference of the owner of the FS, a preference of the BSP, or any combination thereof.

In Step 708, the fuel station communication settings are set. In one or more embodiments of the invention in which the FS is remotely provisioned, Step 708 is performed prior to Step 700 or soon after Step 700. In such cases, Step 708 is performed at an initial (or early) stage in order to establish a connection with the BSP. Once the connection is established, the BSP may remotely configure the FS. In Step 710, the initial FS fuel information is obtained. In one embodiment of the invention, the FS fuel information is obtained by taking initial readings of the fuel input meters. In another embodiment of the invention, at least a portion of the initial FS fuel information is manually input by the individual configuring the FS.

Those skilled in the art will appreciate that the content of the FSR may change over time based on updated information provided by the FS, the BSP, the owner of the FS and/or other individuals.

Figure 7B:
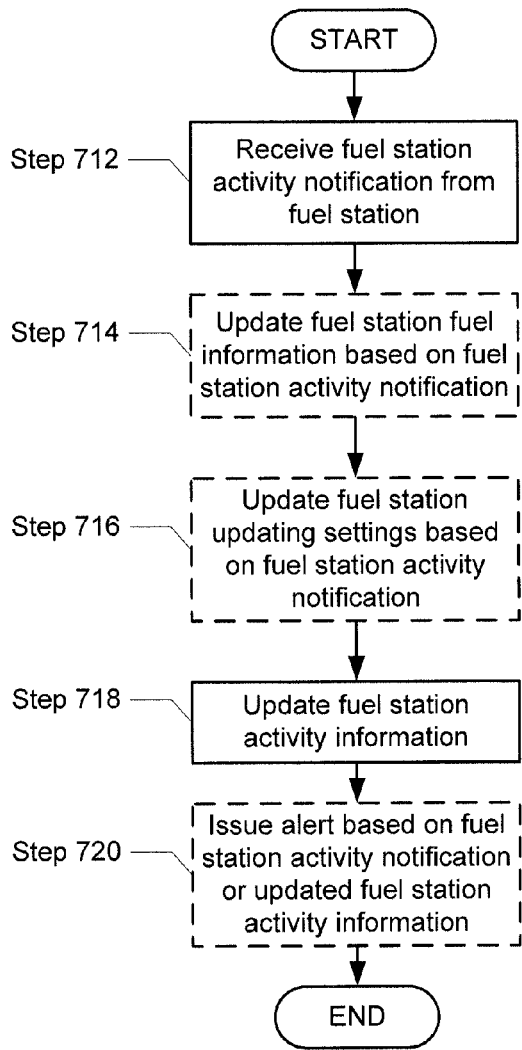

FIG. 7B shows a flowchart for receiving a fuel station activity notification from a fuel station by a BSP. More specifically, the FS activity notifications correspond to notifications generated by the FS based on entries in the FS activity information. Further, FS activity notifications may also be sent at various internals (as discussed above) to the BSP. In such cases, there may be no new entries in the FS activity information; however, the FS may automatically generate a FS activity notification that includes the current status of the FS.

Turning to FIG. 7B, in Step 712, a FS activity notification is received.

Optionally, in Step 714, the FS fuel information in the FSR located on the BSP is updated using the information in the FS activity notification. For example, the FS activity notification may indicate that a user successfully completed fueling at the FS and, as such, the corresponding FSR is updated to reflect this event. In another example, the FS activity notification may indicate that a certain amount of fuel has been input into the FS and/or generated in the FS. In such cases the corresponding FSR is updated to reflect this/these events.

Optionally, in Step 716, the FS update settings are updated based on the FS activity notification. For example, if the FS is configured to send activity notifications based on the average activity of the FS, then over time, the frequency at which activity notifications are received may be altered based on the more recent activity of the FS. For example, if, over time, the FS becomes less active, then the frequency of the activity notifications may decrease over time.

In Step 718, the FS activity information in the corresponding FSR in the BSP is updated with information from the FS activity notifications. Optionally, in Step 720, an alert is issued based on the FS activity notification. For example, if the FS activity notification indicates a dangerous (or potentially dangerous) environmental condition at the FS, that the FS has been tampered with, and/or that the FS is not working within normal operating conditions, then an alert may be issued to the relevant individual(s) to notify them of this development. Further, the BSP may also issue a command to the FS to place the FS in maintenance mode or in shut-down mode.

In one embodiment of the invention, when the FS is in maintenance mode, the FS may still be remotely accessible to the BSP; however, users may not be able to obtain fuel from the FS until the FS is placed back into active mode. The FS may be remotely placed back into an active mode once the issue that triggered the mode change is addressed. For example, a broken part on the FS may be fixed or the sensor reading that triggered the mode change returned to a normal operating range. In one embodiment of the invention, when the FS is in shut-down mode, the FS is shut OFF and is not remotely accessible to the BSP. Once the FS is repaired, the FS may be returned to active mode. The shut-down mode is used to address situations when maintaining power to the FS is unsafe.

Figure 8:
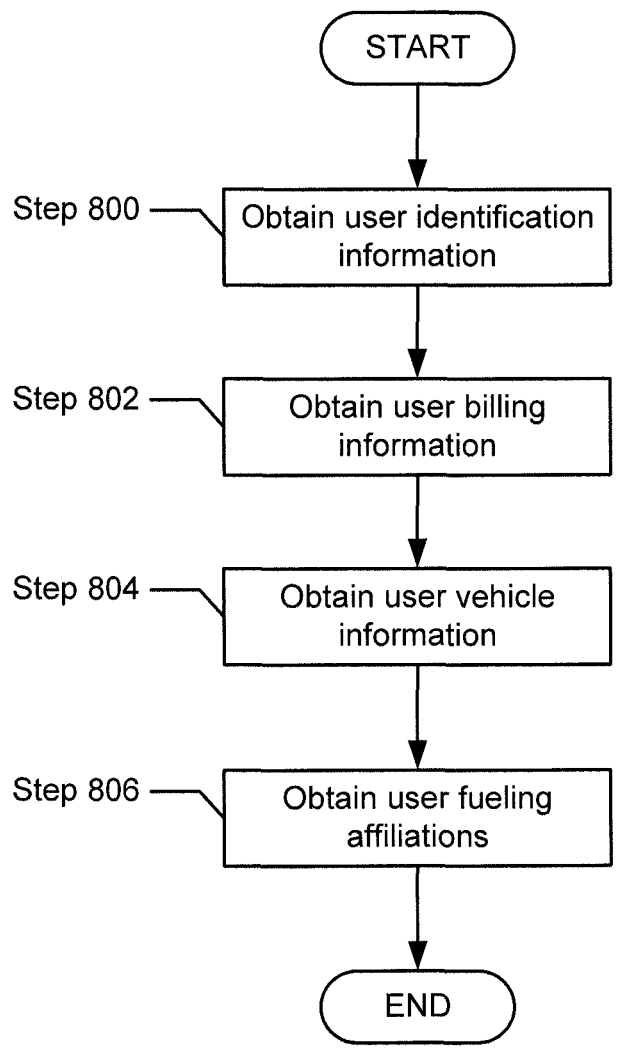

FIG. 8 shows a flowchart for setting up a user record in accordance with one or more embodiments of the invention. In Step 800, the user identification is obtained. In one or more embodiments of the invention, the user identification information may be obtained from the user, from another individual, generated by the BSP, or any combination thereof.

In Step 802, the user billing information is obtained. In one or more embodiments of the invention, the user billing information may be obtained by the user, from another individual, or a combination thereof. In Step 804, the user vehicle information is obtained for each user vehicle that can use fuel supplied by one or more of the fuel stations. For example, the user vehicles may include a hybrid vehicle and an electric car.

In Step 806, the user fueling affiliations are obtained. In one or more embodiments of the invention, the user fueling affiliations may be obtained from the user, from another individual, or any combination thereof.

Those skilled in the art will appreciate that the content of the user record may change over time based on updated information provided by the user, the BSP, and/or other individuals.

Figure 9A:
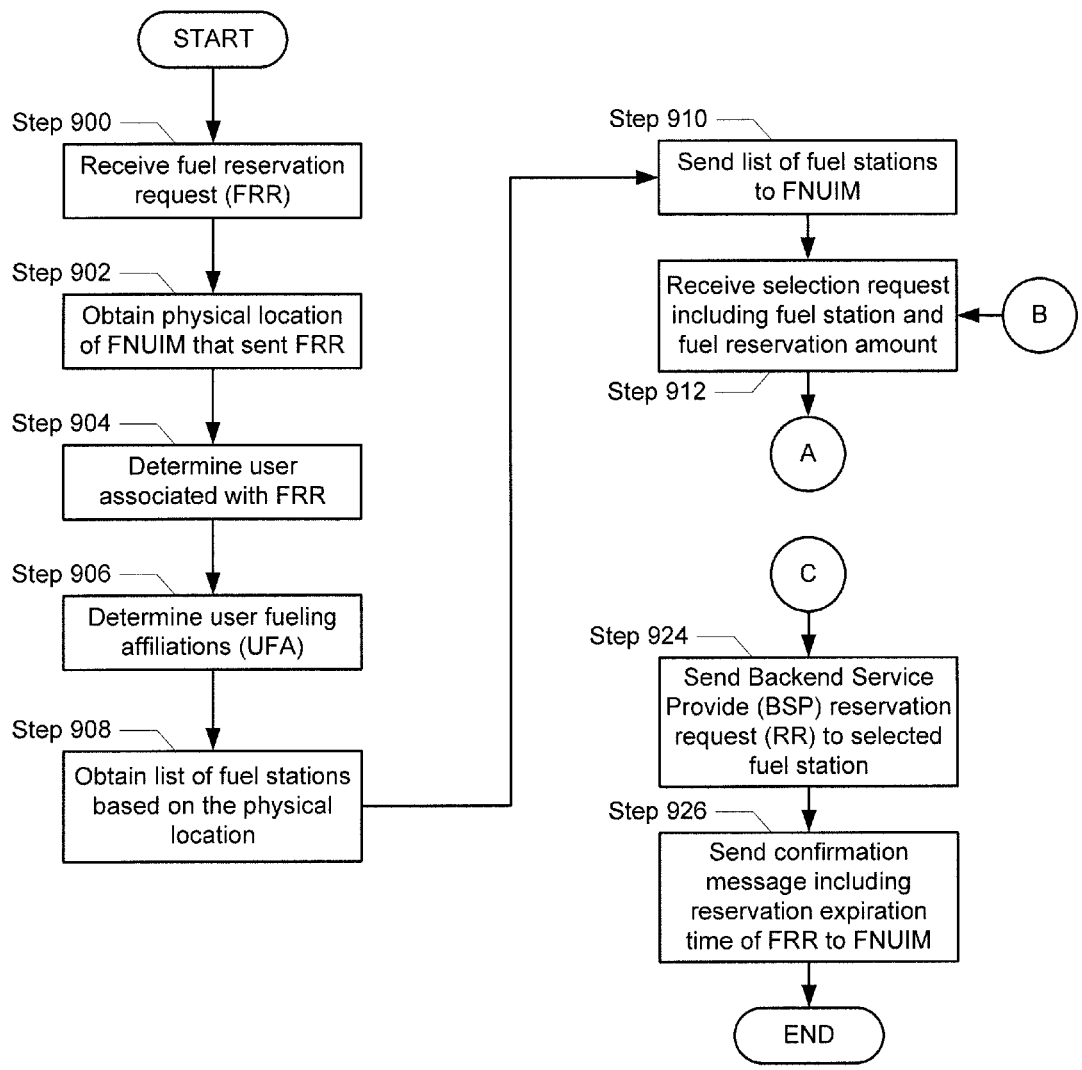
Figure 9B:
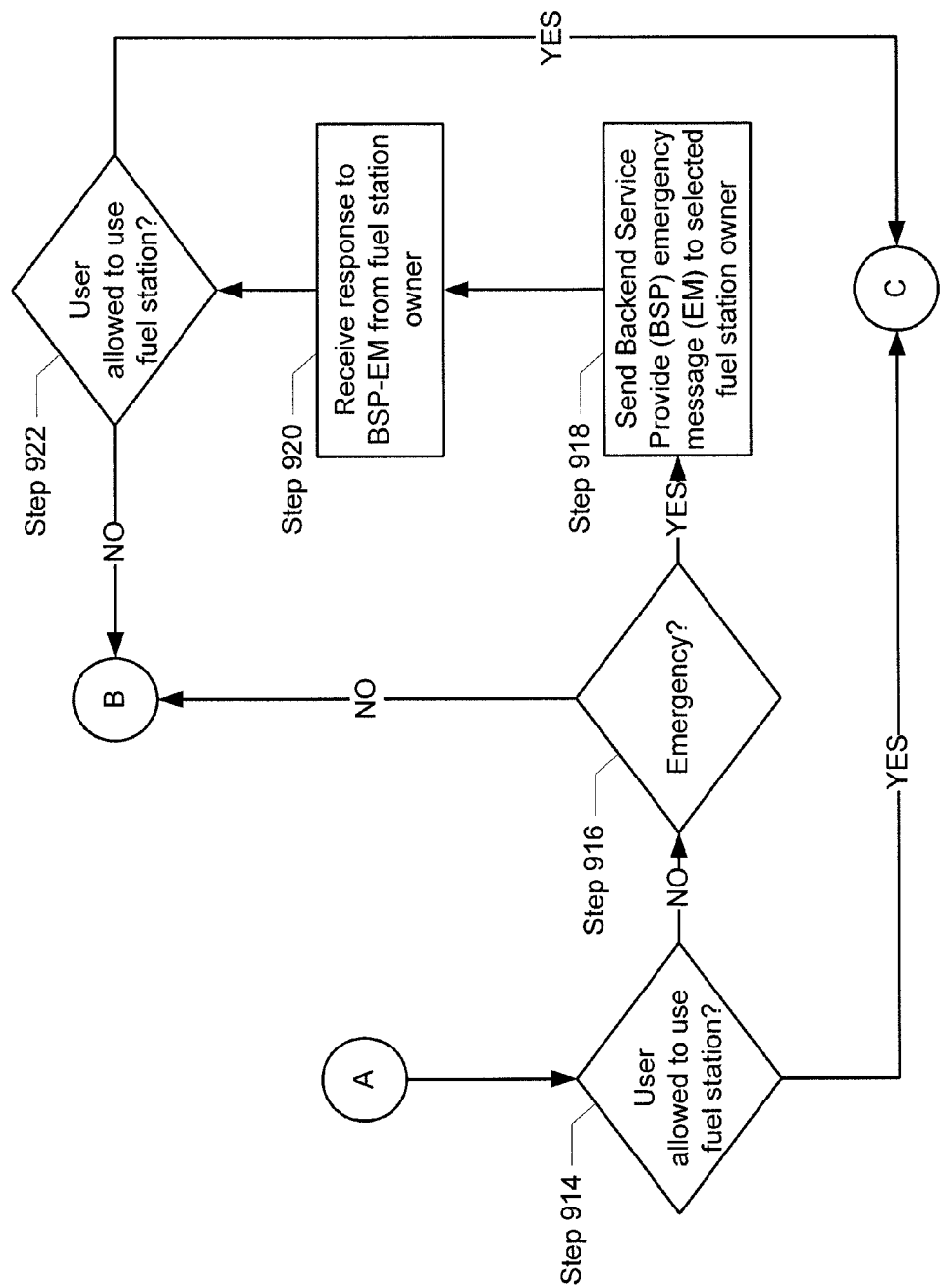

FIGS. 9A and 9B show a flowchart for reserving fuel from the perspective of the BSP in accordance with one or more embodiments of the invention. In Step 900, a fuel reservation request (FRR) is received from the FNUIM. The FRR may be generated by a user of the FNUIM, automatically generated by the FNUIM when the FNUIM (or more specifically a particular application on the FNUIM) is initiated, and/or automatically by the FNUIM based on the fuel information obtained from the vehicle.

In Step 902, the physical location of the FNIUM that sent the FRR is obtained. The physical location may be obtained using information provided in the FRR such as an address, GPS coordinates, other location information, etc. In Step 904, the user associated with the FRR is determined. The user may be identified based on, for example, a user ID (or other identifying information of the user) in the FRR.

In Step 906, the user fueling affiliations (UFA) are determined based on the identity of the user obtained in Step 904. For example, the UFA are determined by using the identity of the user to locate the corresponding user record on the BSP, where the user record includes information about the UFA. Alternatively, the UFA may be obtained from the FRR. In another alternative, Step 906 is not performed on the BSP; rather, Step 906 is performed as part of Step 1004 in FIG. 10.

In Step 908, the list of fuel stations is obtained by the BSP based on the physical location. In one embodiment of the invention, the BSP may identify all fuel stations within a defined distance from the physical location of the FNUIM. The defined distance may be set on a per-user basis, on a per-group of users basis, or may be the same for all users. In another embodiment of the invention, the FRR may include information about the defined distance. For example, the user may specify the defined distance in the FNUIM. In another example, the defined distance may be determined using fuel information about the remaining distance the vehicle may travel on the amount of fuel remaining in the vehicle. In one embodiment of the invention, the defined distance is a of 5 miles.

In Step 910, the list of fuel stations is sent to the FNUIM. The list of fuel stations may include information about each fuel station including, but not limited to, the physical location of the fuel station, the price per unit of each type of fuel at the fuel station, the amount of each type of fuel available at the fuel station, the other services offered at the fuel station, the user or group of users that may access the fuel station, and the status of the fuel station (e.g., active, shut-down mode, maintenance mode).

In addition, the BSP may also obtain and send advertisements to display on the FNUIM (see FIGS. 13A-13H), where the advertisements are based on the physical location of the FNUIM and/or the user of the FNUIM. In Step 912, the BSP receives a selection request from the FNIUM that specifies the fuel station from the list of fuel stations and the fuel reservation amount for a particular type of fuel.

In Step 914, a determination is made about whether the user is allowed to access the fuel station. In one embodiment of the invention, this information is based on the UFA obtained in Step 906. If the user is allowed to access the fuel station, then the process proceeds to Step 924; otherwise the process proceeds to Step 916.

In Step 916, a determination is made about whether the FRR is an emergency FRR (EFRR). In one embodiment of the invention, an EFFR is issued by the FNUIM when the user requires fuel but there are no FSs with which he is affiliated that he can reach based on the amount of fuel remaining in the vehicle. If the FRR is an EFRR, then the process proceeds to Step 918; otherwise the process proceeds to Step 912.

In Step 918, a BSP emergency message (BSP-EM) is sent to the owner of the fuel station (or another authorized individual) to determined whether to grant the user access to the selected fuel station. In one embodiment of the invention, the owner (or another authorized individual) is sent an electronic message (e.g., an email, a text message, etc.). In another embodiment of the invention, the owner (or another authorized individual) is called via phone to request oral authorization.

In Step 920, a response to the BSP-EM is received from the owner of the fuel station (or another authorized individual). In one embodiment of the invention, response is sent via electronic message (e.g., an email, a text message, etc.). In another embodiment of the invention, the response is provided via phone.

In Step 922, a determination is made about whether the user is allowed to access the fuel station. In one embodiment of the invention, this information is based on the response obtained in Step 922. If the user is allowed to access the fuel station, then the process proceed to Step 924; otherwise the process proceeds to Step 912.

In Step 924, a BSP reservation request (BSP-RR) is sent to the selected fuel station. In one embodiment of the invention, the reservation request includes the amount of fuel requested, the total price of the fuel requested, and the reservation expiration time. In one embodiment of the invention, the reservation expiration time is calculated using (i) the driving distance from the physical location of the FNUIM and the physical location of the selected fuel station and (ii) an amount of additional time to be added to (i). The amount of additional time is set such that the user has sufficient time to reach the fuel station taking in to account the possibility of traffic and other issues that may increase the amount of time it takes the user to travel to the selected fuel station.

In one embodiment of the invention, the reservation expiration time is (i)+15 minutes. In another embodiment of the invention, the reservation expiration time is (i)+(ii), where (ii) is determined based on the current traffic conditions between the physical location of the user and the physical location of the selected fuel station. In Step 926, a confirmation message is sent to the FNUIM that includes the amount of fuel requested, the price of the fuel requested, and the reservation expiration time.

Figure 10:
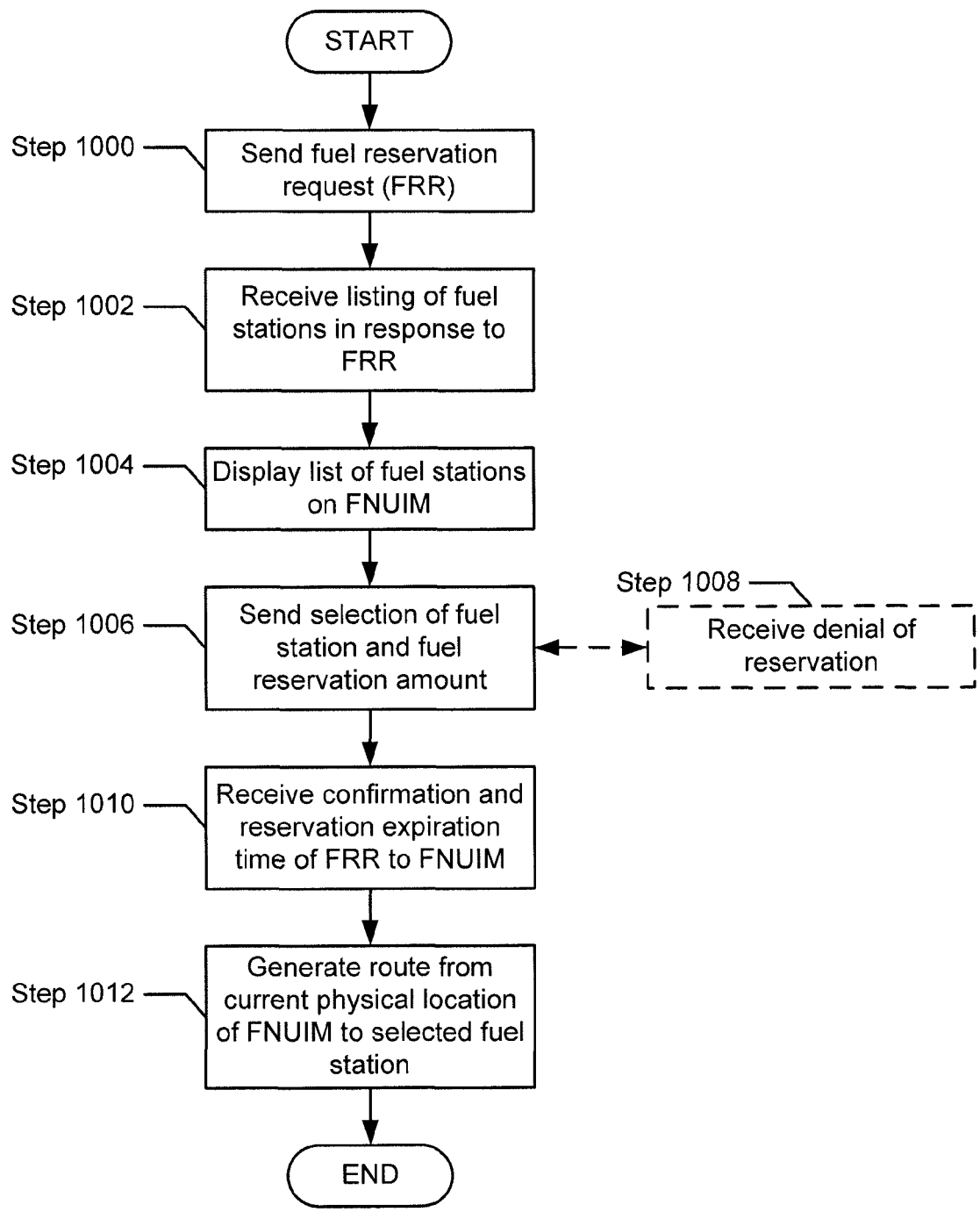

FIG. 10 shows a flowchart for reserving fuel from the perspective of the FNUIM in accordance with one or more embodiments of the invention. In Step 1000, a FRR is sent to the BSP. As discussed above, the FRR may be generated by a user of the FNUIM, automatically generated by the FNUIM when the FNUIM (or more specifically a particular application on the FNUIM) is initiated, and/or automatically by the FNUIM based on the fuel information obtained from the vehicle. In Step 1002, a list of fuel stations (and associated information) is received from the BSP.

In Step 1004, the list of fuel stations is displayed on the FNUIM. In one embodiment of the invention, each fuel station on the list of fuel stations is displayed on a map on the user interface, where each fuel station is represented by an icon. In one embodiment of the invention, the color of the icon indicates information about the fuel station. For example, (i) if the fuel station has enough fuel (excluding the amount already reserved) to fill the user's vehicles' fuel tank, then the icon is green; (ii) if the fuel station includes enough fuel (excluding the amount already reserved) to fill at least half of the user's vehicle's fuel tank, then the icon is yellow; (iii) if the fuel station does not include enough fuel (excluding the amount already reserved) to fill at least half of the user's vehicle's fuel tank, the user is not allowed to access the FS (e.g., because the user is not affiliated with the FS), or because the station is not in active mode, then the icon is red. In addition to the color of the icon, information such as the price of each type of fuel and other services offered at the fuel station may also be displayed on the user interface of the FNUIM. Those skilled in the art will appreciate that the other color schemes may be used instead of the one described above without departing from the invention.

In Step 1006, the FNUIM sends a message including the selected fuel station and a fuel reservation amount to the BSP. Optionally, in Step 1008, the FNUIM may receive a denial of the request, for example, due to the scenarios in Steps 914-922. In such cases, the process proceeds back to Step 1006 until such time as the FNUIM receives a response discussed in Step 1010. In Step 1010, the FNUIM receives a confirmation of the reservation as well as the reservation expiration time. In Step 1012, the FNUIM generates a route from the physical location of the FNUIM to the selected fuel station.

Figure 11:
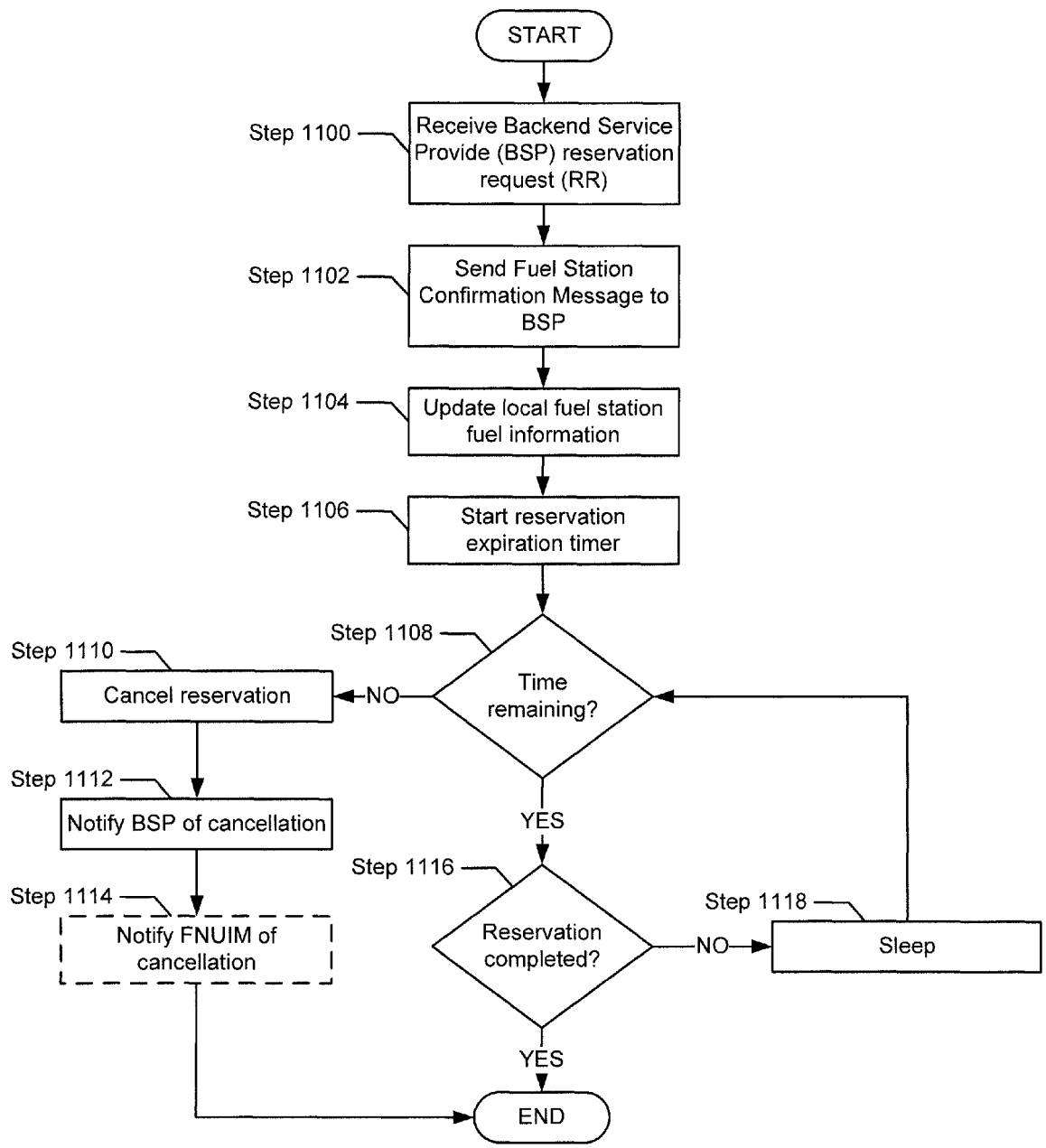

FIG. 11 shows a flow chart for reserving fuel from the perspective of the FS in accordance with one or more embodiments of the invention. In Step 1100, the FS receives a BSP-RR from the BSP that includes the reservation expiration time and the fuel reservation amount. In Step 1102, the FS sends a confirmation message to the BSP to indicate that the FS has received the BSP-RR. In Step 1104, the local FS fuel information is updated to reflect that fuel has been reserved. The amount of fuel reserved corresponds to the amount of fuel in the BSP-RR.

In Step 1106, the reservation expiration timer is started. In Step 1108, a determination is made about whether there is time remaining to fulfill the reservation. Said another way, a determination is made about whether the reservation expiration time has expired. If the reservation expiration time has expired, the process proceeds to Step 1100; otherwise the process proceeds to Step 1116.

In Step 1110, if the reservation expiration time has expired then the reservation is cancelled. In one embodiment of the invention, cancelling the reservation includes releasing the reserved fuel amount such that another user may reserve the fuel. In Step 1112, the BSP is notified of the cancellation.

Optionally, in Step 1114, the FNUIM from which the reservation was initiated is notified of the cancellation. The FS and/or the BSP may notify the FNUIM of the cancellation. In one embodiment of the invention, the FNUIM may be notified using an electronic message (e.g., an email, a text message, etc.). After step 1114 the process ends.

In Step 1116, if the reservation expiration time has not expired then a determination is made about whether the reservation has been completed. If the reservation has been completed, the process ends; otherwise, the process proceeds to Step 1118. In Step 1118, the process performing the method shown in FIG. 11 temporarily sleeps/waits for a predetermined period of time and then proceeds to Step 1108.

In one embodiment of the invention, prior to the reservation time expiring the user, via the FNUIM, may request additional time to reach the FS. In such cases, the reservation expiration time may be increased to provide the user additional time to reach the FS. However, the user may be limited to the amount of additional time that they may add to the reservation expiration time. Further, the user may be limited to the number of times he may request additional time for a given reservation and/or limited to the number of times he may request additional time over multiple reservations (e.g., a user may only request additional time once out of every ten reservations).

Figure 12:
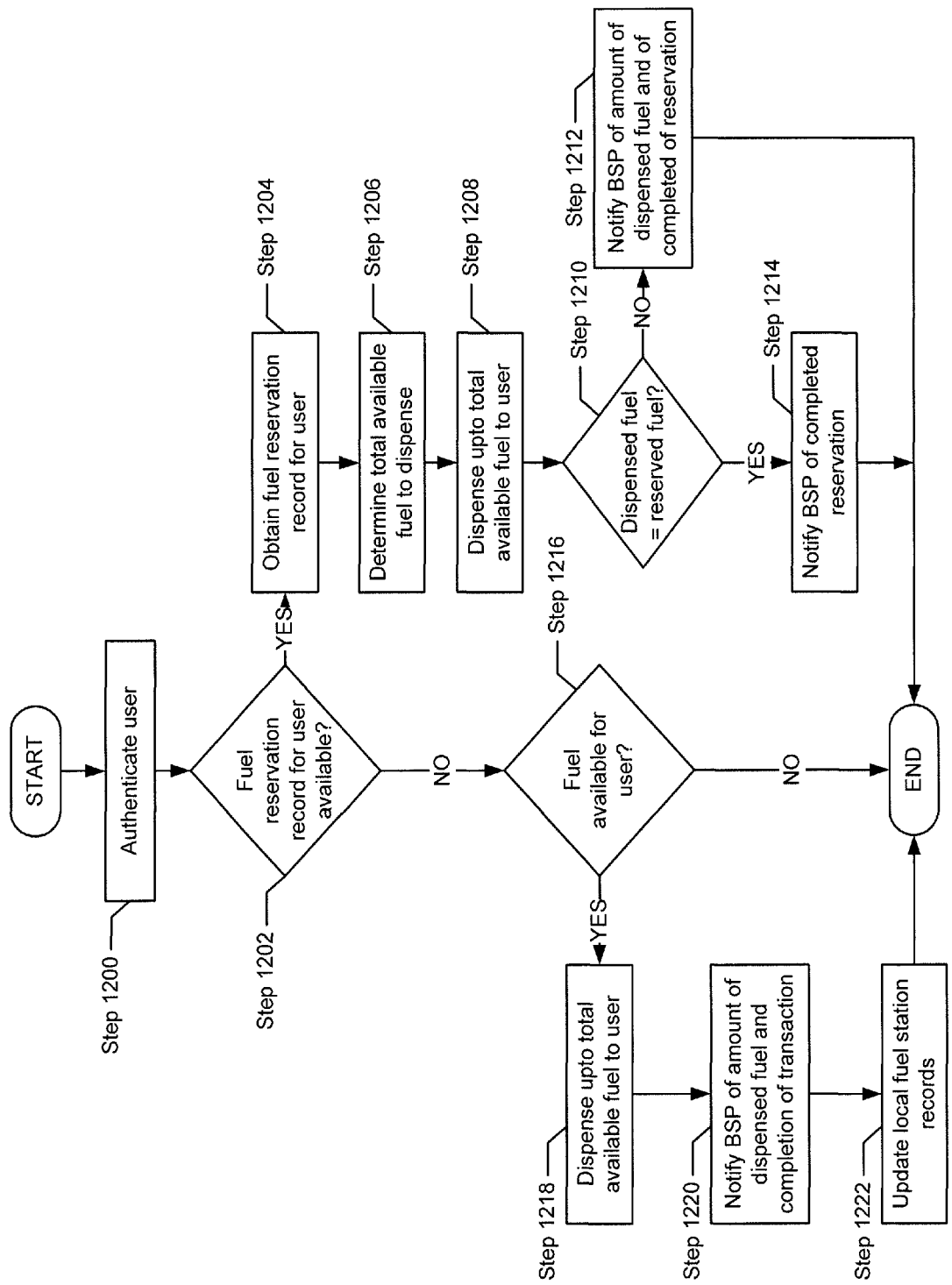

FIG. 12 shows a flow chart for fueling from the perspective of the FS in accordance with one or more embodiments of the invention. In Step 1200, the user is authenticated by the BSP and/or FS. In one embodiment of the invention, the user uses the FNUIM for authentication. In such cases, the user may enter a password, biometric information, other authentication information, or any combination thereof in to the FNUIM. The FNUIM, the BSP and/or the FS may authenticate the user. Once authenticated, the FS (if it did not perform the authentication) is informed that the user is authenticated and the user is granted access to the FS. In other embodiments of the invention, user may be authenticated directly by the FS through the user interface, display and/or a communication interface. For example, the user may use a radio-frequency identifier, a smartcard, universal serial bus (USB) token, or any combination thereof for authentication. In another embodiment of the invention, the FS may include a barcode reader and barcode reader may be used to authenticate the user. For example, the user may enter a PIN into to the FNUIM. The FNUIM and/or the BSP may authenticate the user based on the PIN. Once authenticated the FNUIM may present the barcode (e.g., a 1D barcode, a 2D barcode, etc.) on its display. The barcode reader on the FS may then reader the barcode from the FNUIM and grant access based on the content in the barcode.

Those skilled in the art will appreciate that a user who is a valid user (i.e., is registered in the BSP) but that does not have access to the FS (e.g., because the user is not allowed to access the FS) will not be successfully authenticated in Step 1200.

In Step 1202, upon successful authentication, the FS determines whether there is a fuel reservation record for the user at the FS. The FS may not include a fuel reservation record for the user if (i) the user did not reserve any fuel or if the user's fuel reservation has been cancelled. If there is a fuel reservation record for the user at the FS, then the process proceeds to Step 1204; otherwise the process proceeds to Step 1216. In Step 1204, the fuel reservation record for the user is obtained. In Step 1206, the total amount of fuel to dispense is determined from the information in the fuel reservation record. In Step 1208, fuel is dispensed to the vehicle, where the amount of fuel is limited to the total amount of fuel determined in Step 1206.

In Step 1210, a determination is made about whether the dispensed fuel is equal to the amount of fuel that was specified in the fuel reservation record. If the dispensed fuel is equal to the amount of fuel that was specified in the fuel reservation record, then the process proceeds to Step 1214; otherwise the process proceeds to step 1212. In Step 1212, the BSP is notified about the actual amount of fuel dispensed and that the reservation has been completed. This step may also include updating the local FS record. After this step stage the process ends. In Step 1214, the BSP is notified that the reservation has been completed. After this step stage the process ends.

In Step 1216, a determination is made about whether there is fuel available for the user. In one embodiment of the invention, available fuel corresponds to fuel that is currently stored in the FS and that is not currently reserved by another user. If there is fuel available for the user, then the process proceeds to Step 1218; otherwise the process ends. In Step 1218, fuel is dispensed to the vehicle, where the amount of fuel is limited to the total amount of fuel available to the user. In Step 1220, the BSP is notified about the actual amount of fuel dispensed and that the reservation has been completed. In Step 1222, the local FS record updated to reflect the fuel dispensed.

The following is an example in accordance with one or more embodiments of the invention. The example is not intended to limit the scope of the invention.

Figure 13C:
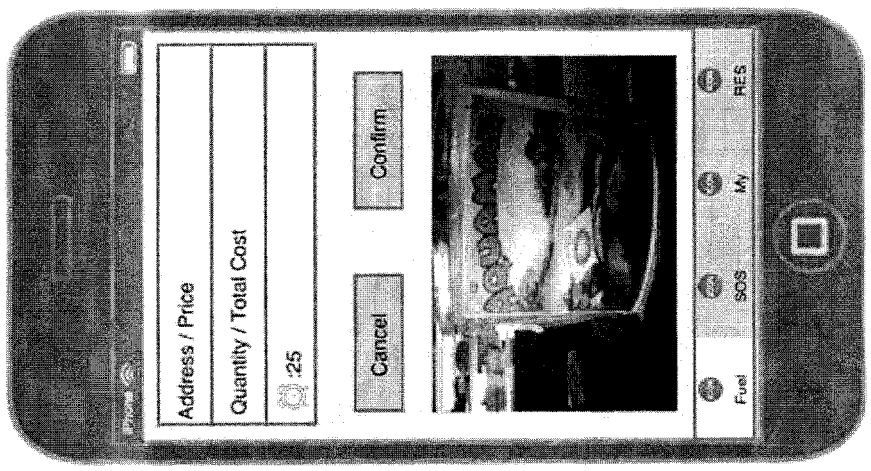
FIGS. 13A-13H shows an example in accordance with one or more embodiments of the invention.
Figure 13B:
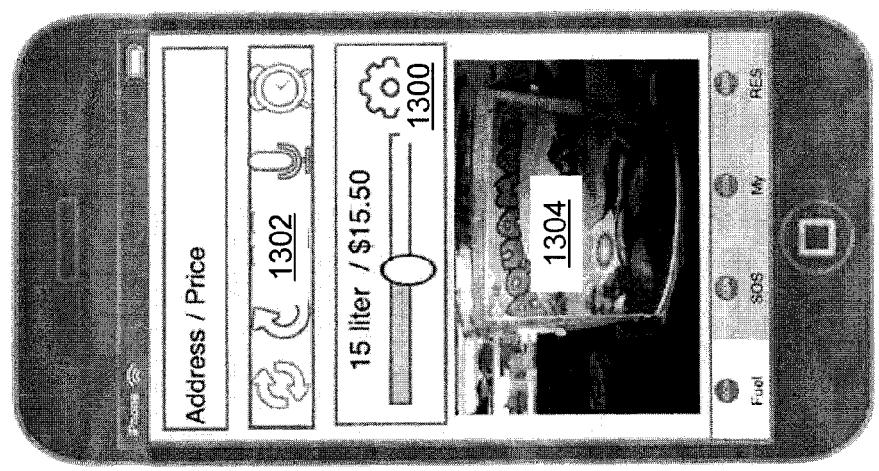
Figure 13A:
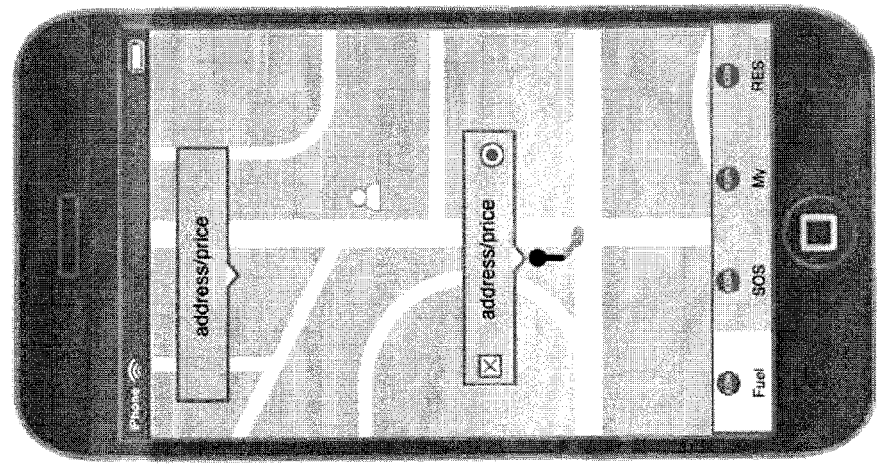

In the example shown in FIGS. 13A-13H, the FNUIM is implemented as a smart phone with a touch screen user interface/display. Referring to FIG. 13A, when the user initiates a fuel reservation application on the smart phone, by default the application sends an FRR to the BSP based on the current location of the FNUIM. In response, the FNUIM receives the list of fuel stations and displays them on the display on a map.

Referring to FIG. 13B, the user may reserve fuel by selecting a fuel station and then using the slide bar (1300) to select an amount of fuel. When the user selects a particular fuel station, the user may also be presented with a list of other services (1302) available at the fuel station and an advertisement (1304). Referring to FIG. 13C, the user is presented with the information about the selected fuel station, the amount of fuel reserved, the total cost of the reserved fuel, a reservation expiration time, and a request for confirmation of the fuel reservation.

Figure 13F:
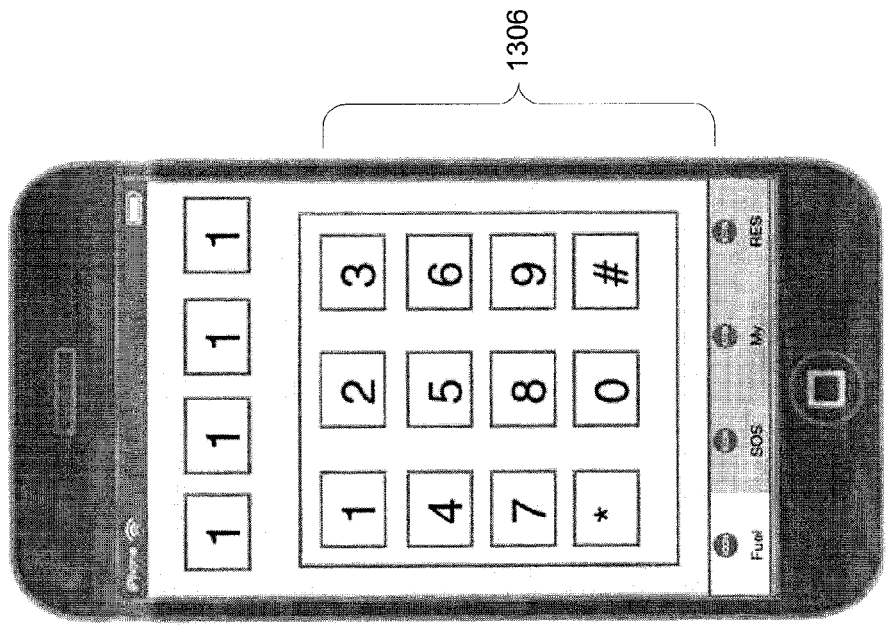
Figure 13E:
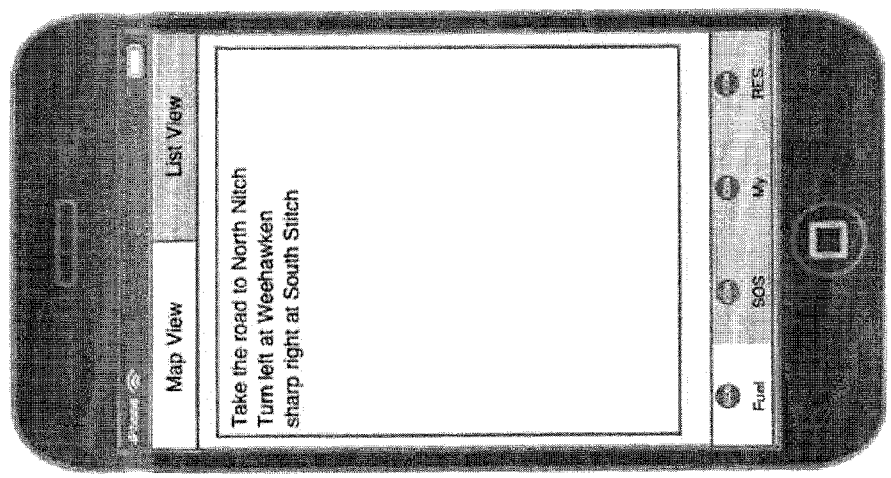
Figure 13D:
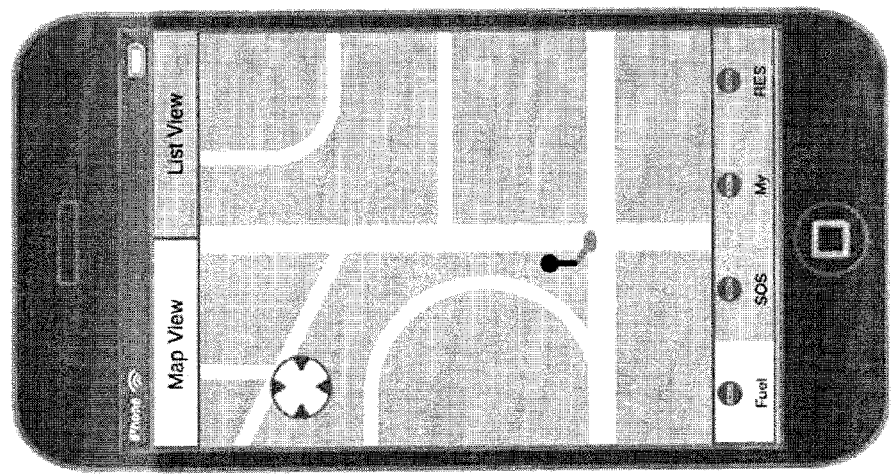

Referring to FIGS. 13D and 13E, once the user has confirmed the fuel reservation, the FNUIM displays a map showing directions from the current location of the FNUIM to the selected fuel station. In addition, the user may also review a list of directions to the selected fuel station.

Figure 13H:
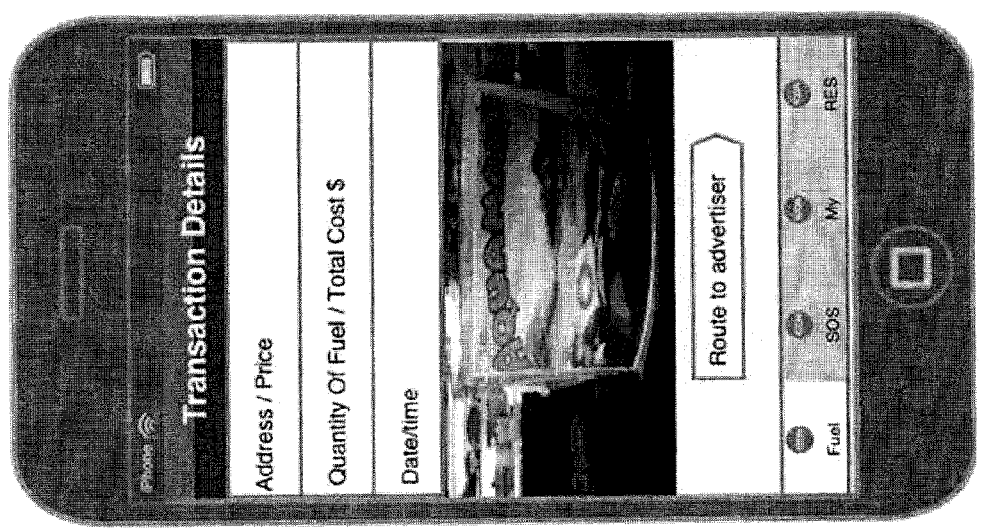
Figure 13G:
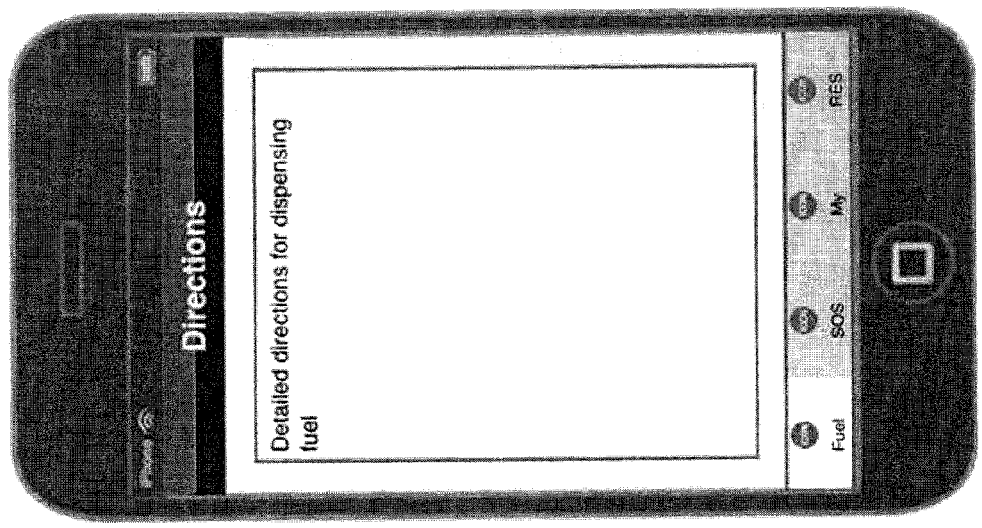

Referring to FIG. 13F, when the user reaches the fuel station, the user may be prompted to enter a password for purposes of authenticating the user. In this example, the display (1306) may be grayed out until the user is within 1 meter (or another predefined distance) from the selected fuel station. This prevents a user from unlocking the fuel station until they are in close proximity to the fuel station. Referring to FIG. 13G, once authenticated, the user is presented, via the FNUIM, directions on how to dispense fuel from the fuel station. Referring to FIG. 13H, once the fuel dispensing is complete, the user is presented with a summary of the transaction details as shown in FIG. 13H.

Computer readable program code to perform embodiments of the invention may be stored on a non-transitory computer readable storage medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s) such as an integrated circuit, central processor unit, or other hardware processor, is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising computer readable program code embodied therein for causing a computer system to perform a method, the method comprising:
   receiving a fuel reservation request (FRR) from a fuel network user interface module (FNUIM);
   obtaining a physical location of the FNUIM;
   determining a user associated with the FRR;
   obtaining a list of fuel stations using the physical location and information associated with the user;
   sending, to FNUIM, a list of fuel stations;
   receiving, from the FNUIM, a selection request specifying a fuel station from the list of fuel stations and a fuel reservation amount specifying an amount of fuel;
   sending a backend service provider (BSP) reservation request to the fuel station, wherein the BSP reservation request comprises the fuel reservation amount; and
   sending a confirmation message comprising a reservation expiration time to the FNUIM, wherein the reservation expiration time is based, at least in part, on current traffic conditions between the physical location of the FNUIM and the fuel station,
      wherein the amount of fuel is reserved until the expiration of the reservation expiration time.

2. The non-transitory computer readable medium of claim 1, wherein the list of fuel stations comprises an amount of fuel for reservation at each fuel station on the list of fuel stations.

3. The non-transitory computer readable medium of claim 2, wherein the list of fuel stations further comprises a physical address of each fuel station on the list of fuel stations and a fuel price for at least one type of fuel available at each fuel station on the list of fuel stations.

4. The non-transitory computer readable medium of claim 1, wherein information associated with the user comprises user fueling affiliations (UFA), wherein the UFA specifies a fueling group of which the user is a member, wherein only members of the fueling group can access the fuel station.

5. The non-transitory computer readable medium of claim 1, wherein the fuel is one selected from a group consisting of hydrogen, compressed natural gas, and electricity.

6. The non-transitory computer readable medium of claim 1, wherein obtaining the physical location of the FNUIM comprises extracting the physical location from the FRR and wherein determining the user associated with the FRR comprises extracting a user ID from the FRR.

7. A fuel network user interface module (FNUIM), comprising:
   a processor;
   a user interface;
   a memory; and
   software instructions stored in memory, which when executed by the processor, perform a method, the method comprising:
      generating a fuel reservation request (FRR), wherein the FRR specifies a vehicle;
      sending the FRR to a backend service provider (BSP);
      receiving a list of fuel stations from the BSP;
      displaying the list of fuel stations on the user interface;
      generating a selection request specifying a fuel station from the list of fuel stations and a fuel reservation amount specifying an amount of fuel;
      sending the selection request to the BSP; and
      receiving, from the BSP, a confirmation message comprising a reservation expiration time, wherein the reservation expiration time is based, at least in part, on current traffic conditions between a physical location of the FNUIM and the fuel station, wherein the amount of fuel is reserved until the expiration of the reservation expiration time.

8. The FNUIM of claim 7, further comprising:
   a communication interface configured to enable communication between the FNUIM and a positioning system, wherein the FRR comprises a user ID and the physical location of the FNUIM, and
   wherein the physical location is obtained from the positioning system.

9. The FNUIM of claim 8, wherein the FNUIM is a smart phone.

10. The FNUIM of claim 7, the method further comprising:
    prior to generating the FRR:
       obtaining fuel information from a vehicle; and
       determining, based on the fuel information, to initiate the generation of the FRR.

11. The FNUIM of claim 10, wherein the fuel information comprises at least one selected from a group consisting of an amount of fuel remaining in a vehicle and a current rate of consumption of the fuel.

12. The FNUIM of claim 7, wherein displaying the list of fuel stations on the user interface comprises displaying a location of each fuel station on the list of fuel stations on a map using an icon.

13. The FNUIM of claim 12, wherein a color of the icon is determined based on an amount of fuel available at the corresponding fuel station compared to an amount of fuel the vehicle is configured to store.

14. The FNUIM of claim 7, further comprising:
    a positioning system configured to determine the physical location of the FNUIM,
    wherein the FRR comprises a user ID and the physical location of the FNUIM, and wherein the physical location is obtained from the positioning system.

15. The FNUIM of claim 7, wherein the FNUIM is integrated into a vehicle.

16. The FNUIM of claim 7, wherein the fuel is one selected from a group consisting of hydrogen, compressed natural gas, and electricity.

17. A fuel station comprising:
a fuel storage unit configured to store fuel;
a fuel output connection operatively connected to the fuel storage unit and configured to interface with a vehicle to enable transfer of the fuel from the fuel storage unit to the vehicle;
a fuel station control module comprising:
  a processor;
  a memory; and
  software instructions stored in memory, which when executed by the processor, perform a method, the method comprising:
    receiving a backend service provider (BSP) reservation request,
      wherein the BSP reservation request comprises a user ID, a fuel reservation amount specifying an amount of fuel and a reservation expiration time,
      wherein the reservation expiration time is based, at least in part, on current traffic conditions between a physical location of a user and the fuel station,
      wherein the amount of fuel is reserved for the user associated with the user ID at the fuel station until expiration of the reservation expiration time;
    storing, in response to the BSP reservation request, a fuel reservation record comprising the user ID, the fuel reservation amount, and the reservation expiration time;
    prior to expiration of the reservation expiration time:
      receiving a request to access the fuel station from the user associated with the user ID;
      authenticating the user;
      obtaining, after successful authentication, the fuel reservation record using the user ID;
      granting access to the fuel output connection; and
      enabling the user to transfer up to the amount of fuel specified in the fuel reservation amount to the vehicle using the fuel output connection.

18. The fuel station of claim 17, configured to periodically send an update message for the BSP, wherein the update message comprises an amount of fuel currently stored fuel storage unit.

19. The fuel station of claim 17, wherein authenticating the user comprises using at least one selected from a group consisting of a keypad operatively connected to the fuel station, a smart phone, a radio-frequency identifier, a smartcard, universal serial bus (USB) token.

20. The fuel station of claim 17, wherein granting access to the fuel output connection comprising opening the fuel station to access the fuel output connection, wherein the fuel output connection comprises a hose.

21. The fuel station of claim 17, wherein the fuel station control module is configured to communicate with the BSP over at least one selected from a group consisting of a wired network and a wireless network.

* * * * *